United States Patent
Li et al.

(10) Patent No.: US 12,375,746 B2
(45) Date of Patent: Jul. 29, 2025

(54) VIDEO POSTING METHOD AND APPARATUS, ELECTRONIC DEVICE, AND STORAGE MEDIUM

(71) Applicant: BEIJING ZITIAO NETWORK TECHNOLOGY CO., LTD., Beijing (CN)

(72) Inventors: Zhenan Li, Beijing (CN); Wanli Che, Beijing (CN); Cheng Li, Beijing (CN); Xuelun Fu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/604,094

(22) Filed: Mar. 13, 2024

(65) Prior Publication Data

US 2024/0305850 A1    Sep. 12, 2024

Related U.S. Application Data

(63) Continuation of application No. PCT/CN2022/118118, filed on Sep. 9, 2022.

(30) Foreign Application Priority Data

Sep. 13, 2021    (CN) .......................... 202111070886.3

(51) Int. Cl.
    *H04N 21/2743*    (2011.01)
    *H04N 21/4788*    (2011.01)
(52) U.S. Cl.
    CPC ..... *H04N 21/2743* (2013.01); *H04N 21/4788* (2013.01)
(58) Field of Classification Search
    CPC .................. H04N 21/2743; H04N 21/4788
    See application file for complete search history.

(56) References Cited

U.S. PATENT DOCUMENTS 10,694,140 B1 *    6/2020    Chen .................. H04N 21/4758
2013/0283307 A1    10/2013    Avedissian et al.
(Continued)

FOREIGN PATENT DOCUMENTS

CN    107220387 A    9/2017
CN    108989691 A    12/2018
(Continued)

OTHER PUBLICATIONS

International Patent Application No. PCT/CN2022/118118; Int'l Written Opinion and Search Report; dated Nov. 16, 2022; 8 pages.
(Continued)

*Primary Examiner* — Nathan J Flynn
*Assistant Examiner* — Christine A Kurien
(74) *Attorney, Agent, or Firm* — BakerHostetler

(57) ABSTRACT

Provided video posting method, apparatus, electronic device, and storage medium. The method includes after a trigger instruction performed on a video association button for an original video is received, displaying video capturing interface; after associated video captured in the video capturing interface, displaying video editing interface, the associated video is a video associated with the original video; after the associated video edited in the video editing interface, displaying video posting interface; and after posting button in the video posting interface is triggered, posting target video, the posting button is used for posting the associated video as the target video, first switch button for the original video is displayed on target video playback detail page of the target video, and the first switch button is used for switching to display an original video playback detail page of the original video after view instruction is performed on the first switch button.

20 Claims, 16 Drawing Sheets

(56) References Cited

U.S. PATENT DOCUMENTS

| | | |
|---|---|---|
| 2013/0332512 A1 | 12/2013 | Roman et al. |
| 2016/0219339 A1 | 7/2016 | Brockington |
| 2016/0227115 A1 | 8/2016 | Bin Mahfooz et al. |
| 2017/0201478 A1 | 7/2017 | Joyce et al. |
| 2020/0183975 A1 | 6/2020 | Provost et al. |
| 2020/0213326 A1 | 7/2020 | Herman |
| 2020/0274837 A1 | 8/2020 | Hildebrand |
| 2020/0336718 A1* | 10/2020 | Yoon ................ G06F 40/169 |
| 2020/0336806 A1* | 10/2020 | Fels ................ H04N 21/4788 |
| 2020/0356782 A1* | 11/2020 | Liu ................ G06V 20/10 |
| 2021/0397652 A1 | 12/2021 | Li |

FOREIGN PATENT DOCUMENTS

| | | |
|---|---|---|
| CN | 108989692 A | 12/2018 |
| CN | 109348299 A | 2/2019 |
| CN | 110347871 A | 10/2019 |
| CN | 110519617 A | 11/2019 |
| CN | 110784754 A | 2/2020 |
| CN | 111526411 A | 8/2020 |
| CN | 111726536 A | 9/2020 |
| CN | 112214678 A | 1/2021 |
| CN | 112698769 A | 4/2021 |
| CN | 113163230 A | 7/2021 |
| CN | 113382302 A | 7/2021 |
| CN | 113259590 A | 8/2021 |
| CN | 113783997 A | 12/2021 |
| EP | 2051486 A2 | 4/2009 |
| JP | 5235240 B1 | 7/2013 |
| JP | 2021-516911 A | 7/2021 |
| KR | 2018-0113202 A | 10/2018 |
| KR | 2021-0114536 A | 9/2021 |
| WO | WO 2017/150926 A1 | 9/2017 |
| WO | WO 2021/129157 A1 | 7/2021 |
| WO | WO 2021/147414 A1 | 7/2021 |

OTHER PUBLICATIONS

European Patent Application No. 22866755.6; Search Report; dated Oct. 22, 2024; 5 pages.
Office Action for Brazilian Application No. 112024004976-0, mailed Mar. 27, 2025, 15 pages.

* cited by examiner

Display a target video on a target video playback detail page, where the target video playback detail page includes a first switch button, and an original video playback detail page of an original video is switched to display in response to that a view instruction is performed on the first switch button  ∽S210

VIDEO POSTING METHOD AND APPARATUS, ELECTRONIC DEVICE, AND STORAGE MEDIUM

CROSS-REFERENCE TO RELATED APPLICATION(S)

This is a continuation of International Patent Application No. PCT/CN2022/118118, filed Sep. 9, 2022, which claims priority to Chinese Patent Application No. 202111070886.3 filed on Sep. 13, 2021, the disclosures of which are incorporated herein by reference in their entireties.

TECHNICAL FIELD

The present disclosure relates to the field of computer technologies, for example, a video posting method, a video posting apparatus, an electronic device, and a storage medium.

BACKGROUND

With the customers of electrical devices are continuously increased, the electronic devices have been widely used. Applications on the electronic devices also emerge at the historic moment, such as social video applications.

When a user uses the social video application, the user may browse videos. However, the correlation between the multiple types of videos posted in the social video applications is relatively poor.

SUMMARY

The present disclosure provides a video posting method, a video posting apparatus, an electronic device, and a storage medium, to enhance the correlation between videos and improve the experience of browsing the videos for a user.

The present disclosure provides a video posting method. The video posting method includes the steps described below.

In response to that a trigger instruction performed on a video association button for an original video is received, a video capturing interface is displayed.

In response to that an associated video has been captured through the video capturing interface, a video editing interface is displayed, where the associated video is a video associated with the original video.

In response to that an editing completion button in the video editing interface is triggered, a video posting interface is displayed.

In response to that a posting button in the video posting interface is triggered, a target video is posted, where the posting button is used for posting the associated video as the target video, a first switch button for the original video is displayed on a target video playback detail page of the target video, the first switch button is used for switching to display an original video playback detail page of the original video in response to that a view instruction is performed on the first switch button, and the posted target video is displayed in a comment section of the original video.

The present disclosure further provides a video posting apparatus. The video posting apparatus includes a receiving module, a capturing module, an editing module, and a posting module.

The receiving module is configured to, in response to that a trigger instruction performed on a video association button for an original video is received, display a video capturing interface.

The capturing module is configured to, in response to that an associated video has been captured through the video capturing interface, display a video editing interface, where the associated video is a video associated with the original video.

The editing module is configured to, in response to that an editing completion button in the video editing interface is triggered, display a video posting interface.

The posting module is configured to, in response to that a posting button in the video posting interface is triggered, post a target video, where the posting button is used for posting the associated video as the target video, a first switch button for the original video is displayed on a target video playback detail page of the target video, the first switch button is used for switching to display an original video playback detail page of the original video in response to that a view instruction is performed on the first switch button, and the posted target video is displayed in a comment section of the original video.

The present disclosure further provides an electronic device. The electronic device includes one or more processing apparatuses and a storage apparatus configured to store one or more programs. When executed by the one or more processing apparatuses, the one or more programs cause the one or more processing apparatuses to perform the aforementioned video posting method.

An embodiment of the present disclosure further provides a computer-readable medium. The computer-readable medium stores a computer program which, when executed by a processing apparatus, causes the processing apparatus to perform the aforementioned video posting method.

DETAILED DESCRIPTION

Embodiments of the present disclosure are described hereinafter with reference to the drawings. The drawings illustrate some embodiments of the present disclosure, but the present disclosure may be implemented in various manners. These embodiments are provided for ease of understanding of the present disclosure. The drawings and embodiments of the present disclosure are illustrative.

Steps described in method embodiments of the present disclosure may be performed in sequence and/or in parallel. Additionally, the method embodiments may include additional steps and/or omit some of the illustrated steps. The scope of the present disclosure is not limited in this respect.

The term "includes" or its variant used herein means "includes, but is not limited to". The term "based on" means "at least partially based on". The term "an embodiment" means "at least one embodiment". The term "another embodiment" means "at least another embodiment". The term "some embodiments" means "at least some embodiments". Definitions of other terms are given in the description hereinafter.

Concepts such as "first" and "second" mentioned in the present disclosure are used for distinguishing between apparatuses, between modules, or between units and are not intended to limit the order or mutual dependence of the functions performed by these apparatuses, modules, or units.

"One" and "multiple" mentioned in the present disclosure are not limiting but illustrative. It is to be understood by those skilled in the art that "one" and "multiple" are construed as "one or more" unless otherwise specified in the context.

The names of messages or information exchanged between apparatuses in the embodiments of the present disclosure are only used for illustrative purposes and are not intended to limit the scope of the messages or information.

Optional features and examples are provided in each of the embodiments described below. Multiple features described in the embodiments may be combined to form multiple optional solutions. Each numbered embodiment should not be regarded as only one technical solution.

Embodiment One

Figure 1A:
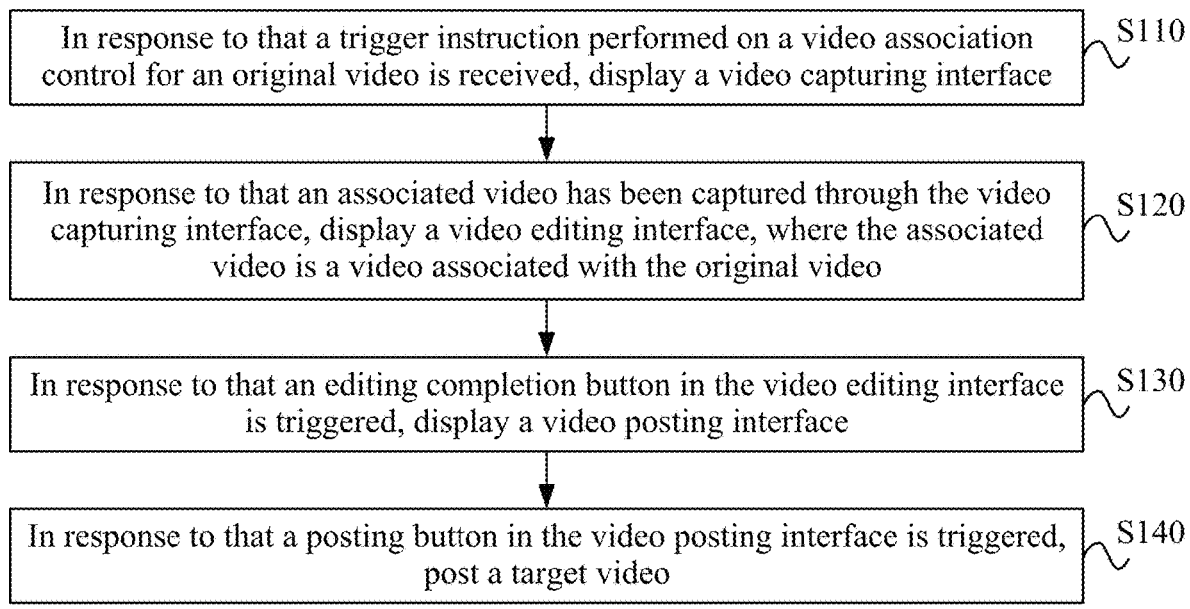
FIG. 1A is a flowchart of a video posting method according to embodiment one of the present disclosure.

FIG. 1A is a flowchart of a video posting method according to embodiment one of the present disclosure. The method is applicable to the case of video association and may be performed by a video posting apparatus. The apparatus may be implemented by software and/or hardware and is generally integrated on an electronic device. In this embodiment, the electronic device includes, but is not limited to, a mobile phone, a computer, and a personal digital assistant.

The video posting method provided in the present disclosure may be applied to social video applications, such as short-video social applications.

A large number of Graphics Interchange Format (GIF) animations and text comments are added every day in comment sections of the social video applications. For some users, comments are made in a visual way with a low threshold compared to wording and sentence-making so that the high requirements for interest in expression are satisfied. The text part includes some high-cost and emotional comments. Therefore, how to encourage users to express high-quality comments to expand the content volume of the social video applications needs to be solved urgently.

In addition, in the scenario where some users perform recreation/re-extension based on historical works, a creator often says "Everyone watches my previous video" at the beginning of the recreated video. However, the operation of the user browsing the previous video of the re-created video is complicated, reducing the probability of the user browsing the video associated with the recreated video. Therefore, how to make the works posted by the creator associated with each other so that a viewer, also known as a browser, can more conveniently perform video jumping needs to be solved urgently. The author may be regarded as a user who posts the work. The viewer or browser may be regarded as a user who browses the work posted by the creator. The work may be regarded as the content posted in the social video application. The work includes, but is not limited to, the video.

Based on this, the present disclosure adds a video association button to encourage the user to interact with the content in the social video application in a more imaginative video form, i.e., to promote the interaction between the users using videos and encourage the user to convert high-quality comments into video expression.

As shown in FIG. 1A, embodiment one of the present disclosure provides a video posting method, also known as a video association method, i.e., a method for associating a target video with an original video. The method includes the steps described below.

In S110, in response to that a trigger instruction performed on a video association button for an original video is received, a video capturing interface is displayed.

The original video may be regarded as a posted video. Any instruction in the present disclosure, such as a trigger instruction, may be regarded as an instruction for performing video association by a user. The original video may be posted by a target user. The user performing video association may be the target user or a user browsing the original video posted by the target user, which is not limited herein.

The video association button may be regarded as a button that triggers video association. The present disclosure does not limit the trigger instruction, and the trigger instruction is determined based on a service scenario. For example, the trigger instruction includes, but is not limited to, a click instruction.

The video capturing interface may be regarded as an interface for performing associated video capturing. An associated video is a video associated with the original video.

The creation of the associated video associated with the original video may be triggered by displaying the video capturing interface.

In this embodiment, to improve the correlation between videos, the video association button may be added, and the position of the video association button is not limited herein. For example, the video association button may be located in a comment box or at any position in the original video, as long as the acquisition of the associated video is triggered in response to that the video association button is triggered.

In S120, in response to that an associated video has been captured through the video capturing interface, a video editing interface is displayed, where the associated video is a video associated with the original video.

The video capturing interface may include a capturing button or a local video acquiring button.

In response to that the capturing button is operated, the associated video capturing may be performed. In response to that the local video acquiring button is operated, the associated video may be selected from the local.

In response to that the associated video is acquired by operating the video capturing interface, the video editing interface may be displayed. The editing of the associated video may be implemented through the video editing interface.

The associated video may be a video created based on the original video, and the associated video is not limited herein, as long as the video content expressed by the associated video is associated with the video content expressed by the original video. For example, the associated video is a video commented on the original video. For another example, the associated video is a video recreated or extended from the original video.

In S130, in response to that an editing completion button in the video editing interface is triggered, a video posting interface is displayed.

The triggering of the editing completion button may indicate that the associated video has been edited. In response to that the editing completion button is triggered, the video posting interface may be displayed. The video posting interface may be regarded as an interface for completing video posting.

In S140, in response to that a posting button in the video posting interface is triggered, a target video is posted.

The posting button is used for posting the associated video as the target video, a first switch button for the original video is displayed on a target video playback detail page of the target video, the first switch button is used for switching to display an original video playback detail page of the original video in response to that a view instruction is performed on the first switch button, and the posted target video is displayed in a comment section of the original video.

The target video playback detail page may be regarded as a page for displaying the target video. In response to that successfully posted, the target video may be browsed by the browser as the work. In this embodiment, the view instruction of the original video playback detail page is not limited to but may be a click instruction performed on a view button or a selection instruction of a playback button in a pop-up window in response to that the click instruction performed on the view button. In response to that the playback button is triggered, the original video playback detail page may be displayed.

The original video playback detail page may be regarded as a page for displaying the original video. In response to that the original video playback detail page is displayed, the original video may be played.

In this embodiment, the position of the first switch button on the target video playback detail page is not limited, and the position of the first switch button may be fixed or may be set during the creation of the target video. The stage from displaying the video capturing interface to triggering the posting button may be regarded as a creation stage of the target video.

In the present disclosure, the posted target video is a video associated with the original video. When the target video is displayed, the first switch button capable of triggering the display of the original video is displayed, thereby achieving the association between the original video and the target video. If the target video is a comment video of the original video, the present disclosure enriches the forms of comments, effectively promotes the interaction between users, and achieves the effect of using the target video to reply to the original video.

In the video posting method provided in embodiment one of the present disclosure, first, in response to that the trigger instruction performed on the video association button for the original video is received, the video capturing interface is displayed; in response to that the associated video has been captured through the video capturing interface, the video editing interface is displayed, where the associated video is a video associated with the original video; then, in response to that the editing completion button in the video editing interface is triggered, the video posting interface is displayed; and finally, in response to that the posting button in the video posting interface is triggered, the target video is posted, where the posting button is used for posting the associated video as the target video, the first switch button for the original video is displayed on the target video playback detail page of the target video, the first switch button is used for switching to display the original video playback detail page of the original video in response to that the view instruction is performed, and the posted target video is displayed in the comment section of the original video. Through the aforementioned technical solution, in response to that the video association button of the original video is triggered, the target video is posted, and the posted target video is associated with the original video.

Based on the aforementioned embodiment, variant embodiments of the aforementioned embodiment are proposed. For the brevity of description, only differences from the aforementioned embodiments are described in the variant embodiments.

In an embodiment, a button for switching the target video includes the first switch button, a second switch button displayed on the video capturing interface, a third switch button displayed on the video editing interface, and a fourth switch button displayed on the video posting interface, where the second switch button is used for switching to display the original video playback detail page in response to that the view instruction is performed, the third switch button is used for switching to display the original video playback details page in response to that the view instruction is performed, adjustment of a playback duration of the original video is triggered in response to that a duration adjustment instruction is performed on the third switch button, the video posting interface includes the fourth switch button, and the fourth switch button is used for switching to display the original video playback detail page in response to that the view instruction is performed. When the first switch button, the second switch button, the third switch button, or, the fourth switch button is displayed, one or more of identification information of a target user, cover information of the original video, or description information of the original video is displayed. In a non-capturing state, the movement attribute of the second switch button is non-movable or movable. The target user is a user who posts the original video.

The first switch button, the second switch button, the third switch button, and the fourth switch button in the present disclosure are buttons displayed in different interfaces. In response to that the view instruction is performed on the first switch button, the second switch button, the third switch button, or the fourth switch button, the original video may be switched to be displayed. In this embodiment, the view instruction is not limited to but may be set based on actual scenarios.

The identification information may be regarded as information that identifies the target user and is not limited herein, such as the nickname of the target user in the social video application. The cover information of the original video may be regarded as information representing the cover of the original video. The description information of the original video may be regarded as information describing the original video. The description information may be text description information of the original video, and the text description information may be information describing the original video when the original video is posted. The description information may also be information describing the original video and the target video.

The capturing state may be regarded as a state of associated video capturing through a camera of the electronic device. The non-capturing state may be regarded as a state in which associated video collection is not performed through the camera of the electronic device.

In an embodiment, in the case where the original video satisfies an invisibility condition, when the first switch button, the second switch button, the third switch button, or the fourth switch button is displayed, prompt information that the original video is not capable of being played and a preset cover are displayed.

The invisibility condition is not limited herein. The preset cover may be regarded as a cover set in advance, and the preset cover may be an image selected from the original video, a default picture, or a default animation.

Figure 1B:
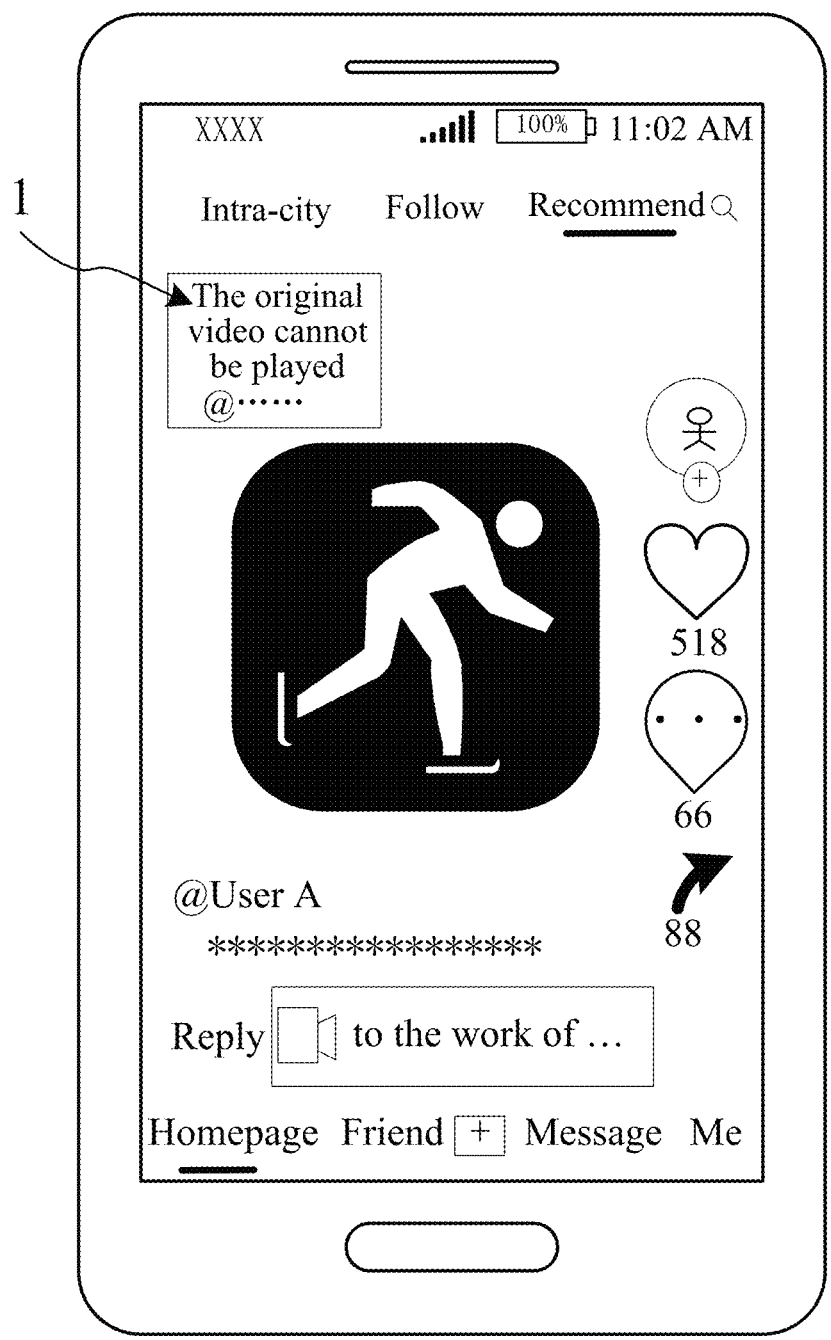
FIG. 1B is a schematic diagram of an interface in response to that a target video is posted according to embodiment one of the present disclosure.

FIG. 1B is a schematic diagram of an interface in response to that a target video is posted according to embodiment one of the present disclosure. Referring to FIG. 1B, the first switch button 1 displays prompt information of "The original video cannot be played". The specific content of the prompt information is not limited herein. The identification information "@ . . . " of the target user may also be displayed on the first switch button 1. The preset cover is not shown in FIG. 1B.

The implementation manner of the first switch button, the second switch button, the third switch button, or the fourth switch button is not limited in the present disclosure, for example, in the form of a video sticker. The first switch button, the second switch button, the third switch button, or the fourth switch button may be regarded as the video sticker of the original video, and the video sticker may be dynamically displayed in real time by pulling from a server.

In an example, when the target video is played, the title (that is, the description information) and the cover information of the original video are dynamically acquired. When the original video satisfies the invisibility condition for the user who is currently viewing the target video, the video sticker displays the identification information of the target user, such as the nickname of the target user and the nickname of the creator of the original video, and also displays the preset cover. The preset cover may be a system default cover and may also display the prompt information that the original video cannot be played.

In an example, when the target video is played, the title (that is, the description information) and the cover information of the original video are dynamically acquired. When the title and cover information of the original video are pulled from the server, the default animation is displayed. When the pull fails, the video sticker may display only the default animation.

The first switch button, the second switch button, the third switch button, or the fourth switch button may not be rendered into the video so that the video may not include the first switch button, the second switch button, the third switch button, or the fourth switch button in response to that being downloaded, thereby improving the download speed.

In an embodiment, the invisibility condition includes whether a user browsing the target video satisfies a condition for browsing the original video or whether the time of browsing the target video is within a time interval of browsing the original video.

The present disclosure does not limit the condition for browsing the original video and the time interval of browsing the original video. The condition for browsing the original video may be used for distinguishing between different users. For example, the condition for browsing the original video includes, but is not limited to, a friend of the target user, or the browsing condition is that the gender of the browser is female. The time interval of browsing the original video may be regarded as a time period during which the original video can be browsed.

In an embodiment, the second switch button is used for switching to display the original video playback detail page in response to that the view instruction is performed, the third switch button is used for switching to display the original video playback details page in response to that the view instruction is performed, adjustment of a playback duration of the original video is triggered in response to that a duration adjustment instruction is performed on the third switch button, the video posting interface includes the fourth switch button, and the fourth switch button is used for switching to display the original video playback detail page in response to that the view instruction is performed.

The view instruction is not limited herein. For example, the view instruction is a click instruction performed on the second switch button. For another example, the view instruction is an instruction of triggering the selected playback button in the displayed pop-up window in response to that clicking on the second switch button. In response to that the playback button is triggered, the original video playback detail page may be displayed.

Figure 1C:
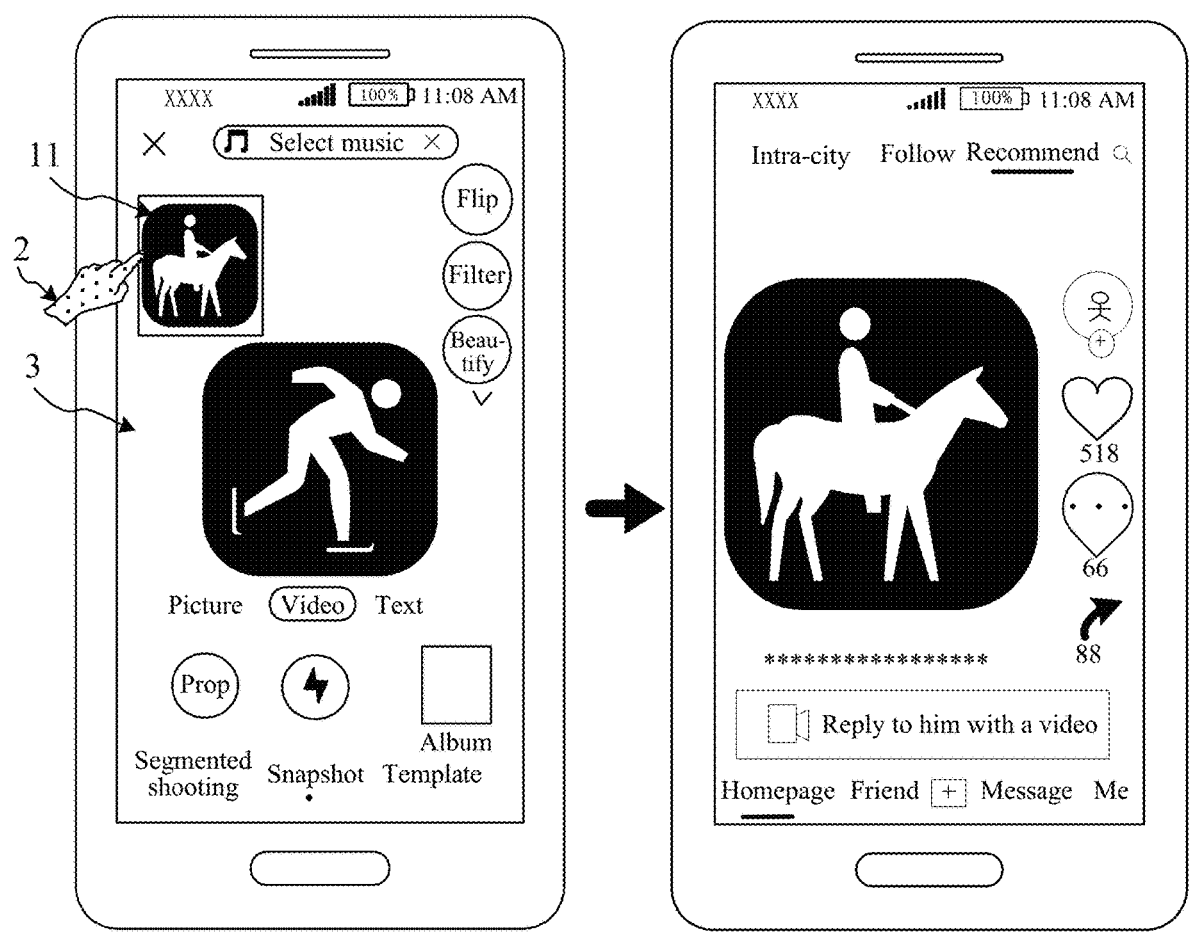
FIG. 1C is a schematic diagram illustrating interface switching according to embodiment one of the present disclosure.

FIG. 1C is a schematic diagram illustrating interface switching according to embodiment one of the present disclosure. Referring to FIG. 1C, in response to that the view instruction is performed on a second switch button 11 of a video capturing interface 3 by a user 2 performing video association, the second switch button 11 switches to the original video playback detail page, to play the original video.

In the schematic diagrams of various video interfaces in the drawings provided in the present disclosure, for example, the videos displayed in the video capturing interface 3, the video editing interface, the original video playback detail page of the original video, and the target video playback detail page of the target video are all displayed in full screen, and the partial display manner in the drawings is only for illustration and not for limitation.

In addition, the video capturing interface 3 in FIG. 1C represents that the electronic device is currently in the capturing state.

Figure 1D:
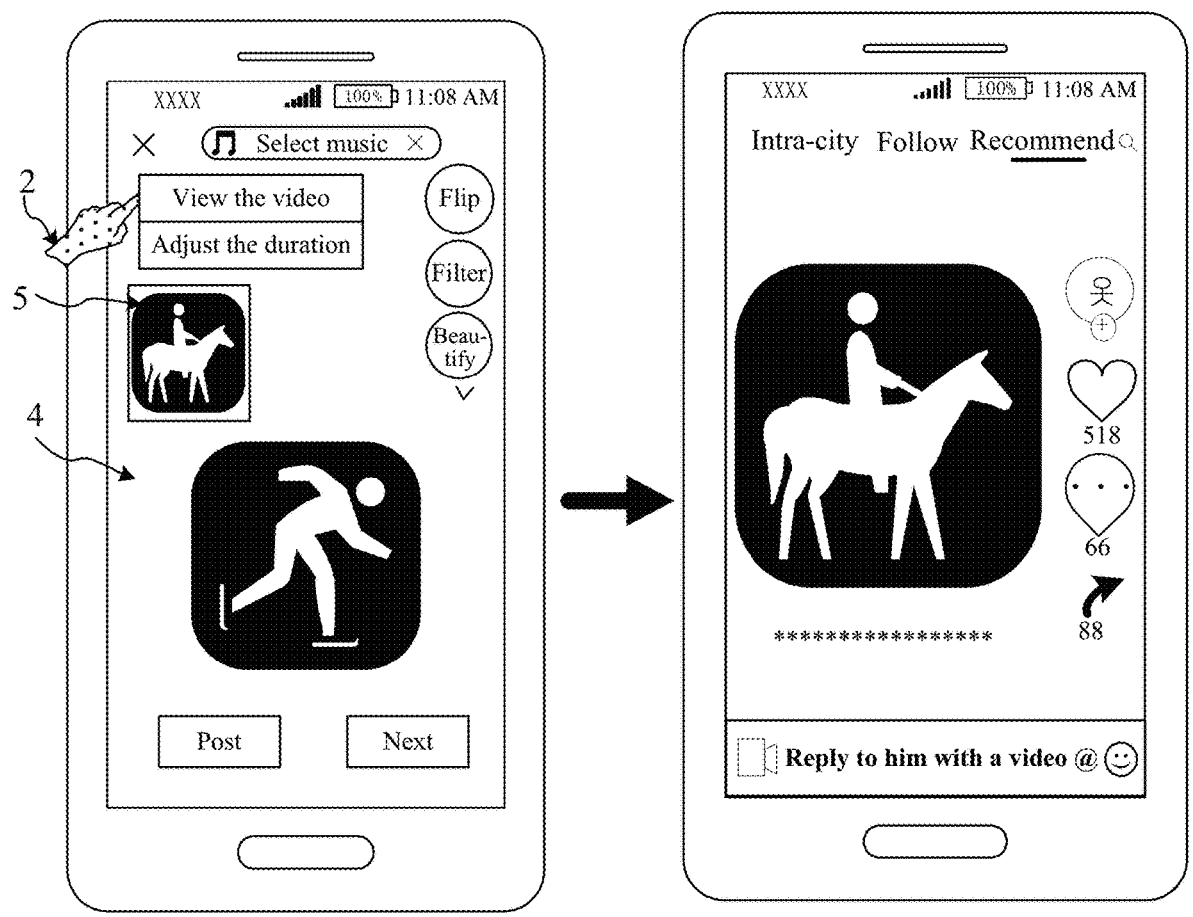
FIG. 1D is another schematic diagram illustrating interface switching according to embodiment one of the present disclosure.

FIG. 1D is another schematic diagram illustrating interface switching according to embodiment one of the present disclosure. Referring to FIG. 1D, in a video editing interface 4, in response to that the view instruction is performed on a third switch button 5, such as clicking on the third switch button 5, the user 2 performing video association clicks on the playback button of "Viewing the video" to switch to the original video playback detail page.

Figure 1E:
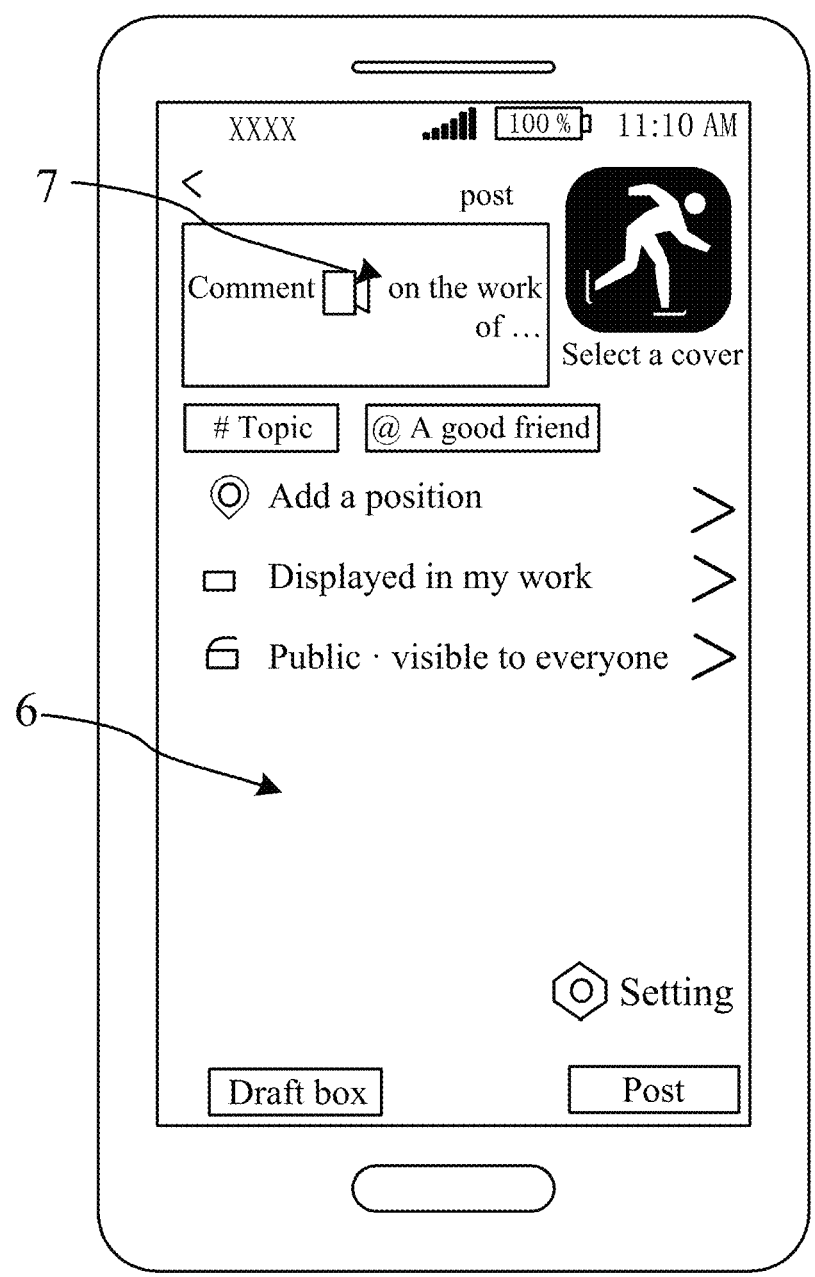
FIG. 1E is a schematic diagram of an interface of a fourth switch button according to embodiment one of the present disclosure.

FIG. 1E is a schematic diagram of an interface of a fourth switch button according to embodiment one of the present disclosure. Referring to FIG. 1E, in response to that the view instruction, such as a click instruction, is performed on a fourth switch button 7 in a video posting interface 6, the original video playback detail page may be switched to.

In an embodiment, the video association button is included in one or more of the comment boxes described below.

The comment boxes include a comment box for commenting on the original video with a video in a comment interface, a comment box included on the original video playback detail page, or a comment box for replying to the original video with a video in the comment interface. The original video playback detail page includes a first playback detail page or a second playback detail page. The first playback detail page is displayed in response to that the original video in a work list of the target user is triggered to be displayed. The target user is a user who posts the original video. The second playback detail page is triggered to be displayed in a different manner from that the first playback detail page is triggered to be displayed. When the video association button is displayed to a set user for the first time, instruction information of the video association button is displayed, where the set user is a user who triggers the display of the comment box, and the instruction information is instruction information for the video association button. In the case where replying to the original video with a video is performed, the original video is a comment in the comment interface, and the comment box for replying to the original video with a video is displayed on the comment interface in response to that the set user triggers a reply button of the original video. In the case where commenting on the original video with a video is performed, the comment interface of the original video includes the comment section, the comment section includes the comment box for commenting on the original video with a video, and the comment box for commenting on the original video with a video is displayed directly on the comment interface.

When the commenting with a video is performed on the original video, the set user does not need to select the comment content in the comment interface and may directly comment on the original video in the comment box. The comment box may be a region for commenting on the original video. The comment box for performing the commenting on the original video with a video may be a comment box in the comment section triggered by operating any comment icon. The comment box on the original video playback detail page may be a comment box directly displayed on the original video playback detail page. The comment box for replying to the original video with a video may be regarded as a comment reply box. When the comment box is the comment reply box, the original video may be a comment in the comment section, such as a comment video, which refers to a video that comments on other videos or other comments in the comment interface. The original video may be a video associated with the other videos, i.e., a target video of the other videos. The other videos may be videos on which the original comments with a video except for the original video, and the other videos may be videos in the comment interface or videos to which the comment interface belongs (the comment interface is an interface for displaying comment information of the other videos). For example, in the video of a user C, a user A replies to the video of the user C, and a user B replies to the video of the user A with a video. The original video may be a video posted by the user A, and the other videos may be videos posted by the user C.

The work list may be a list of works sent by the target user to a video interactive application. The second playback detail page may be a playback page displayed when the playback of the original video is triggered through other paths. The other paths are paths other than the playback of the original video triggered by the path of the work list.

Figure 1F:
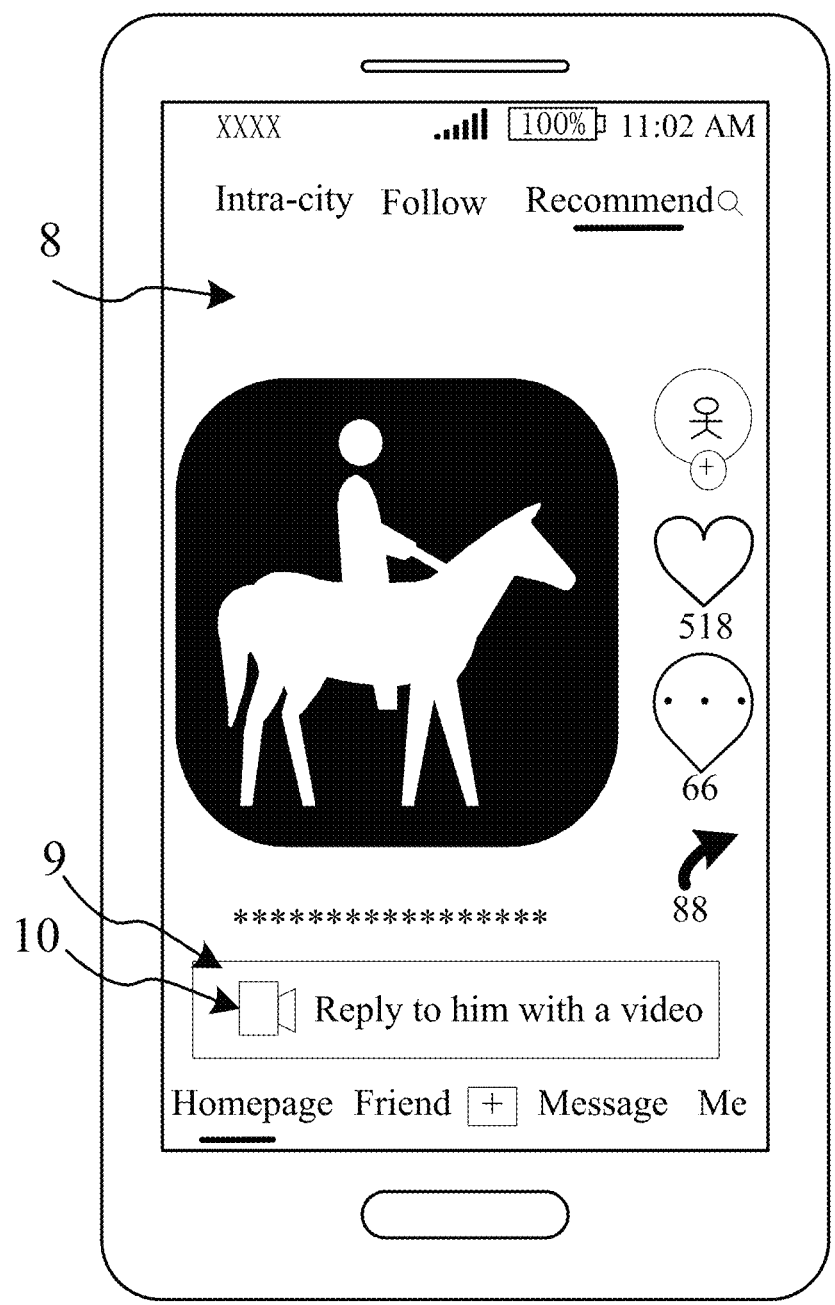
FIG. 1F is a schematic diagram of a comment box on a second playback detail page according to embodiment one of the present disclosure.

FIG. 1F is a schematic diagram of a comment box on a second playback detail page according to embodiment one of the present disclosure. Referring to FIG. 1F, a video association button 10 is displayed in a comment box 9 on a second playback detail page 8. The second playback detail page 8 in FIG. 1F is the original video playback detail page displayed in a recommendation list of the video interactive application. The original video playback detail page in a following list and an intra-city list may also be regarded as the second playback detail page 8. Only the video association button 10 may be displayed in the comment box 9 on the second playback detail page 8. For example, the video association button 10 is directly used as the comment box 9 for triggering comments on the original video, to achieve quick comments.

Figure 1G:
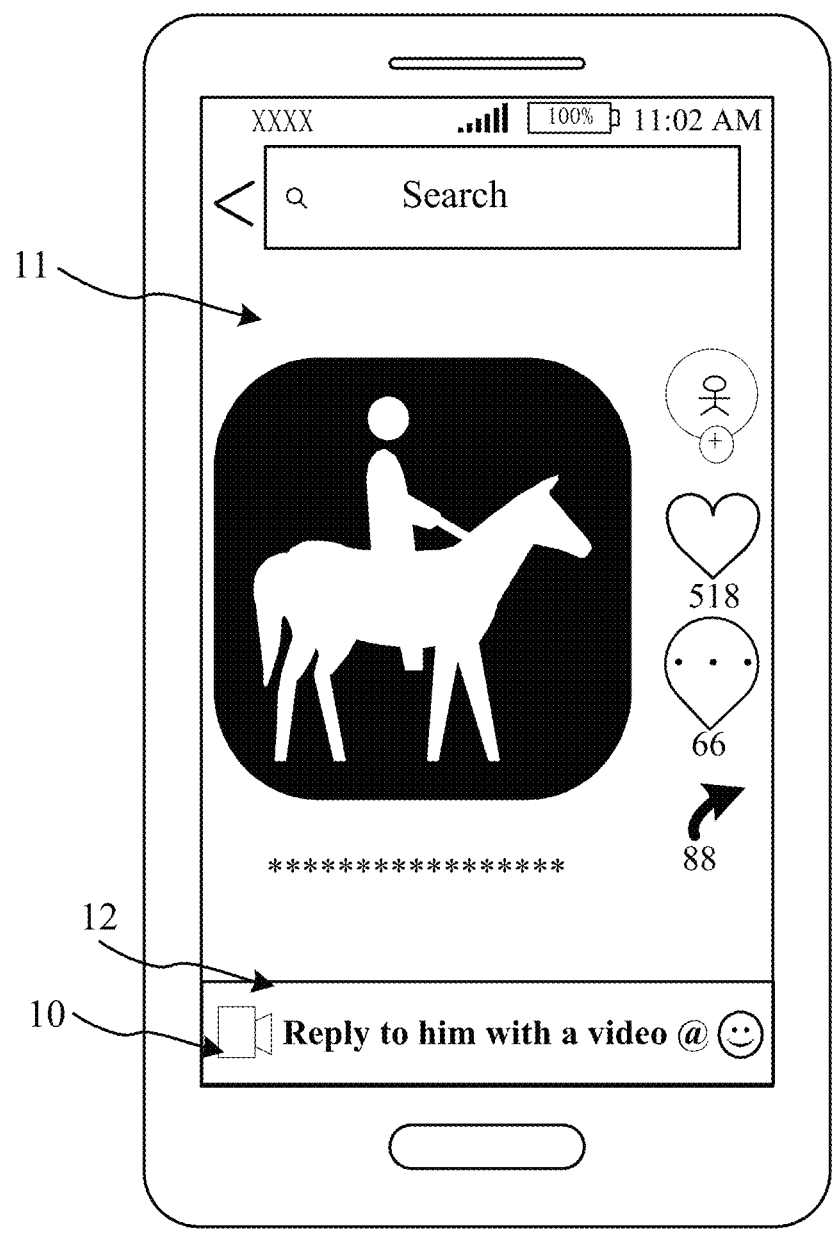
FIG. 1G is a schematic diagram of a comment box on a first playback detail page according to embodiment one of the present disclosure.

FIG. 1G is a schematic diagram of a comment box on a first playback detail page according to embodiment one of the present disclosure. Referring to FIG. 1G, the video association button 10 is displayed in a comment box 12 of a first playback detail page 11. The comment box 12 of the first playback detail page 11 may also include only the video association button 10, which is not limited herein.

Figure 1H:
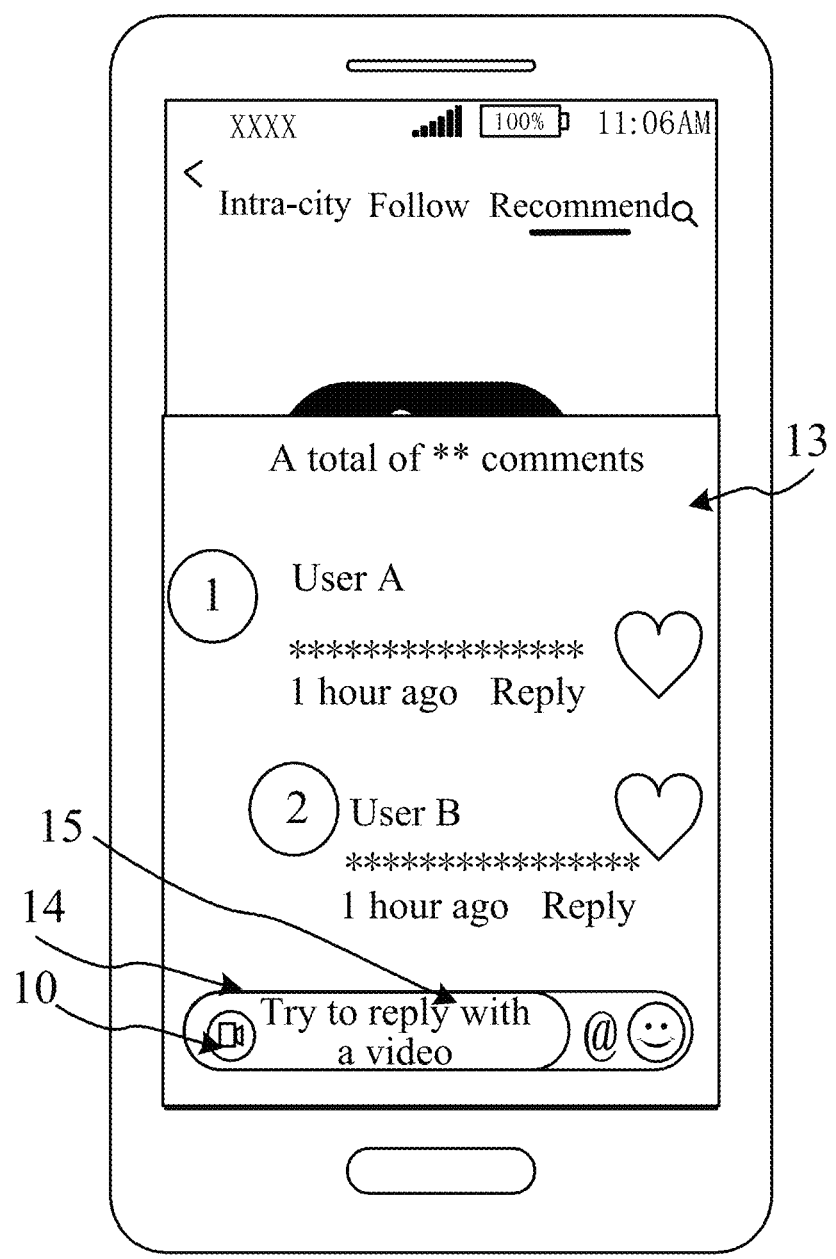
FIG. 1H is a schematic diagram of an interface of a comment box for commenting on an original video with a video according to embodiment one of the present disclosure.

FIG. 1H is a schematic diagram of an interface of a comment box for commenting on an original video with a video according to embodiment one of the present disclosure. Referring to FIG. 1H, in response to that the comment icon of the original video is triggered, a comment section 13 is displayed, a comment box 14 for performing the commenting on the original video with a video may be displayed in the comment section 13, and the video association button 10 may be displayed in the comment box 14.

Figure 1I:
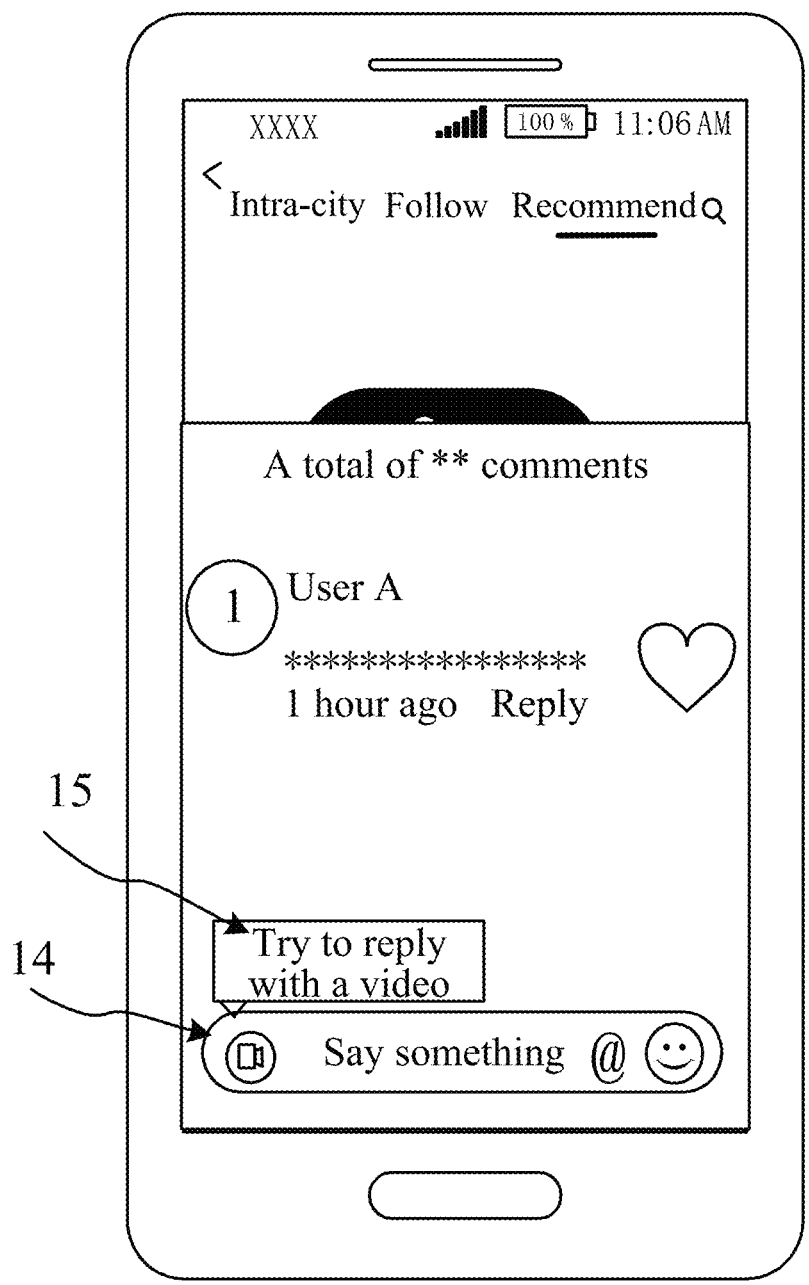
FIG. 1I is a schematic diagram of an interface of instruction information according to embodiment one of the present disclosure.

When the video association button is displayed to the set user for the first time, the instruction information is displayed, and the display form of the instruction information is not limited herein. Instruction information 15 is displayed in the comment box 14 in FIG. 1H. FIG. 1I is a schematic diagram of an interface of instruction information according to embodiment one of the present disclosure. Referring to FIG. 1L, the instruction information 15 is displayed within the preset range of the comment box 14 in a set form, such as a blue bubble. The set user may be a user triggering the display of any one of the comment box for performing the commenting on the original video with a video, the comment box included on the original video playback detail page, or the comment box for replying to the original video with a video for the first time. The instruction information 15 may guide the user to use the video association button 10.

Figure 1J:
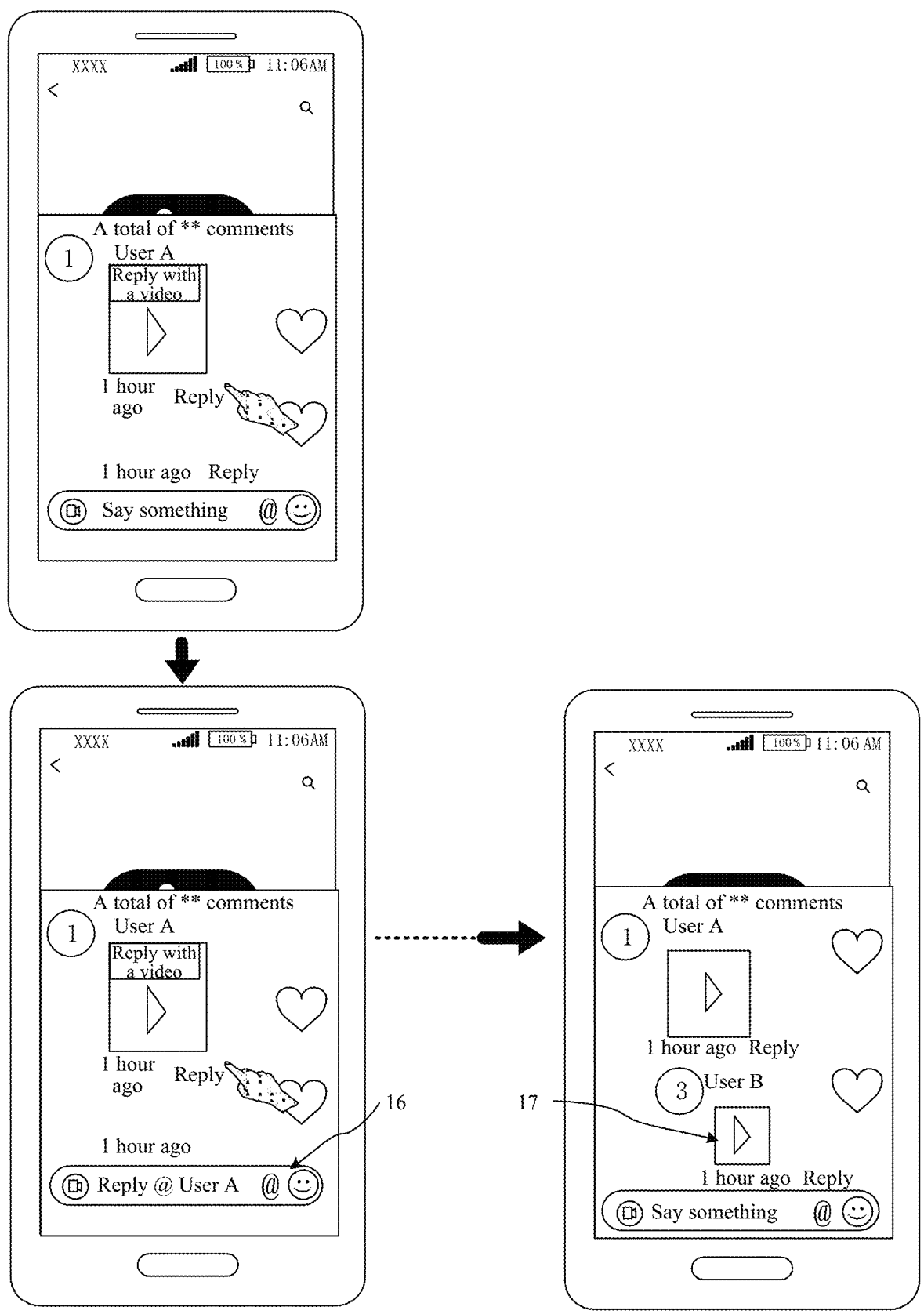
FIG. 1J is a schematic diagram of a comment box for commenting on an original video with a video according to embodiment one of the present disclosure.

FIG. 1J is a schematic diagram of a comment box for commenting on an original video with a video according to embodiment one of the present disclosure. Referring to FIG. 1J, when the user A comments on the video of the user C, in response to that the reply button corresponding to the original video, i.e., the control at the position of "Reply" in the figure, is triggered, a comment reply box 16 is displayed, and the video association button may be included in the comment reply box 16. The target video 17 can be posted through the video association button, and the target video 17 may be used as the comment video of the original video. The original video may be a video posted by the user A.

FIG. 1J omits an interface diagram of interaction for generating a target view.

The present disclosure supports directly launching the commenting with a video in the comment box (a high penetration path, i.e., a path with a relatively high probability of user browsing) and enriches the forms of comments.

In an embodiment, the method further includes the step described below.

In response to that the posting button is triggered, the original video and the comment section corresponding to the original video are displayed, where an upload progress of the target video is displayed in the comment section; and in response to that the target video is uploaded, the target video is displayed in the comment section.

The comment section that is triggered to be displayed may be a comment section where the comment box is located, where the video association button triggered during entering the video capturing interface is located in the comment box. For example, if the video association button in the comment box for performing the commenting on the original video with a video is triggered to enter the video capturing interface, then the displayed comment section is a comment section where the comment box for performing the commenting on the original video with a video is located. The comment box included on the original video playback detail page is similar to the comment box for replying to the original video with a video and is not repeated herein.

Figure 1K:
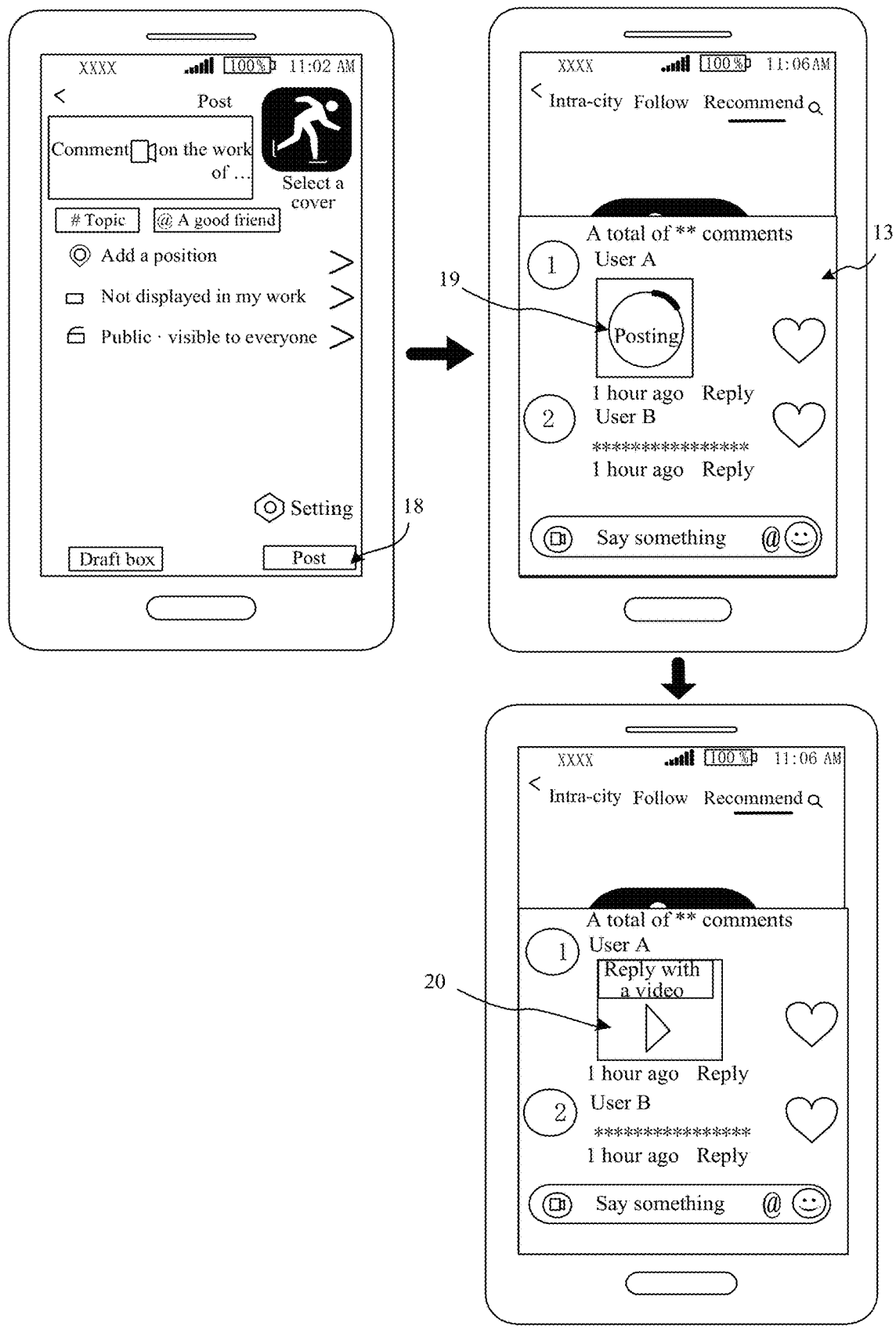
FIG. 1K is a schematic diagram illustrating interface switching in response to that a posting button is triggered according to embodiment one of the present disclosure.
Figure 1L:
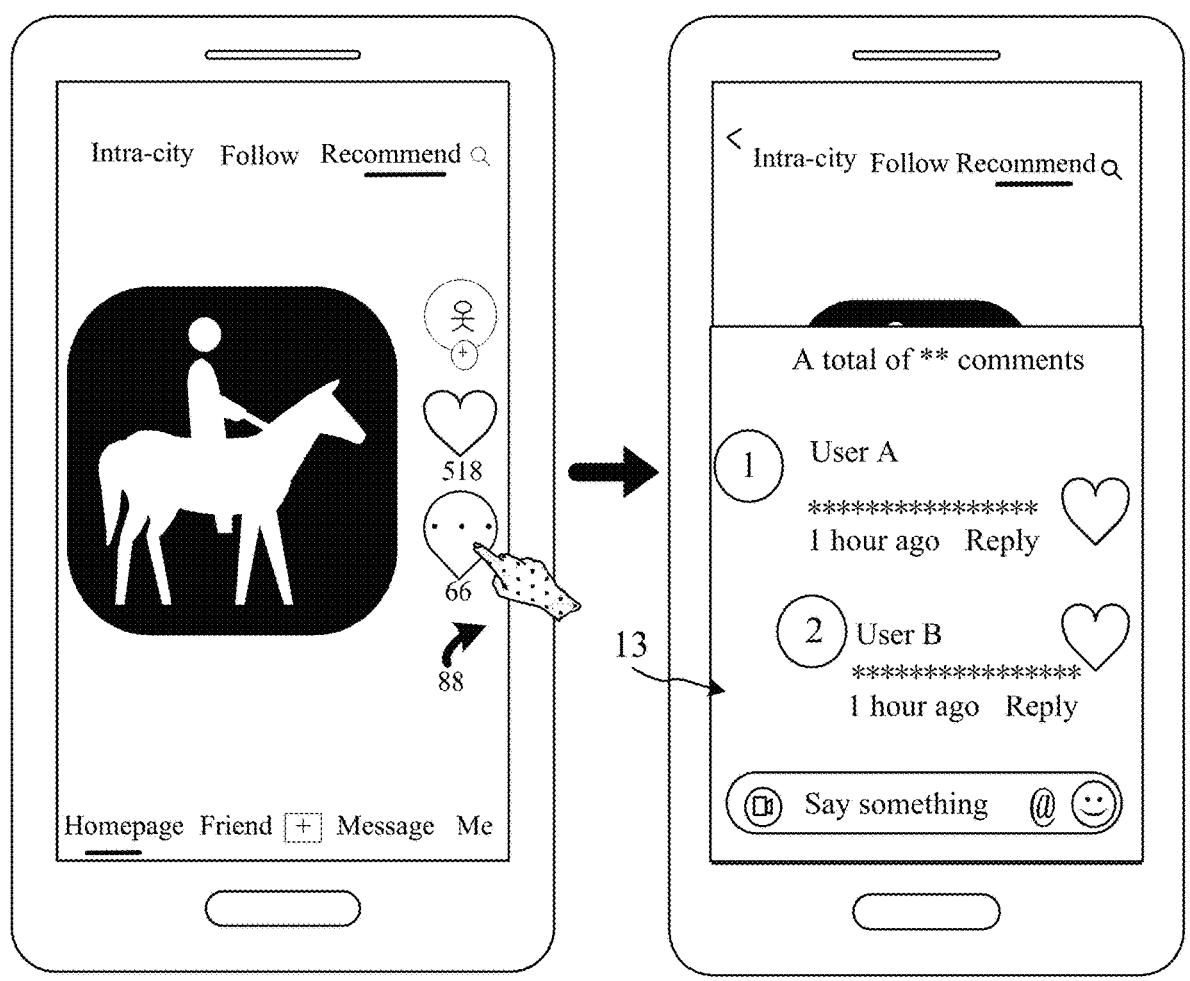
FIG. 1L is a schematic diagram of a comment box for triggering commenting on an original video with a video according to embodiment one of the present disclosure.

FIG. 1K is a schematic diagram illustrating interface switching in response to that a posting button is triggered according to embodiment one of the present disclosure. Referring to FIG. 1K, in response to that a posting button 18 is triggered, the target video is displayed in the comment section 13, and an upload progress 19 of the target video is displayed in the comment section. In response to that the target video is uploaded, the comment section 13 displays a target video 20.

The schematic diagram of the electronic device in the present disclosure is only an example. This embodiment does not limit the form of the electronic device.

FIG. 1L is a schematic diagram of a comment box for triggering commenting on an original video with a video according to embodiment one of the present disclosure. Referring to FIG. 1L, in response to that the comment icon of the original video playback detail page is triggered, the comment section 13 is displayed, and the comment box for performing the commenting on the original video with a video is displayed in the comment section 13.

In an embodiment, the method further includes the step described below.

In response to that switching is performed to display the original video, in the case where the video association button is triggered again, an interface before the switching is returned to.

The first switch button, the second switch button, the third switch button or the fourth switch button is used for switching to display the original video. The original video playback detail page is displayed, and a previous page is returned to in response to that the video association button is triggered again by the user performing video association. For example, in response to that the view instruction is performed on the third switch button on the video editing interface by the user A, the original video playback detail page is displayed, and the video editing interface is returned to in response to that the user A triggers the video association button again.

In an embodiment, the video posting interface includes a selection button for selecting whether to display the target video in a work list of an associated user.

The associated user may be regarded as a user performing video association. The form of the selection button is not limited herein, as long as the selection button can select whether to display the target video in the work list of the associated user.

Figure 1M:
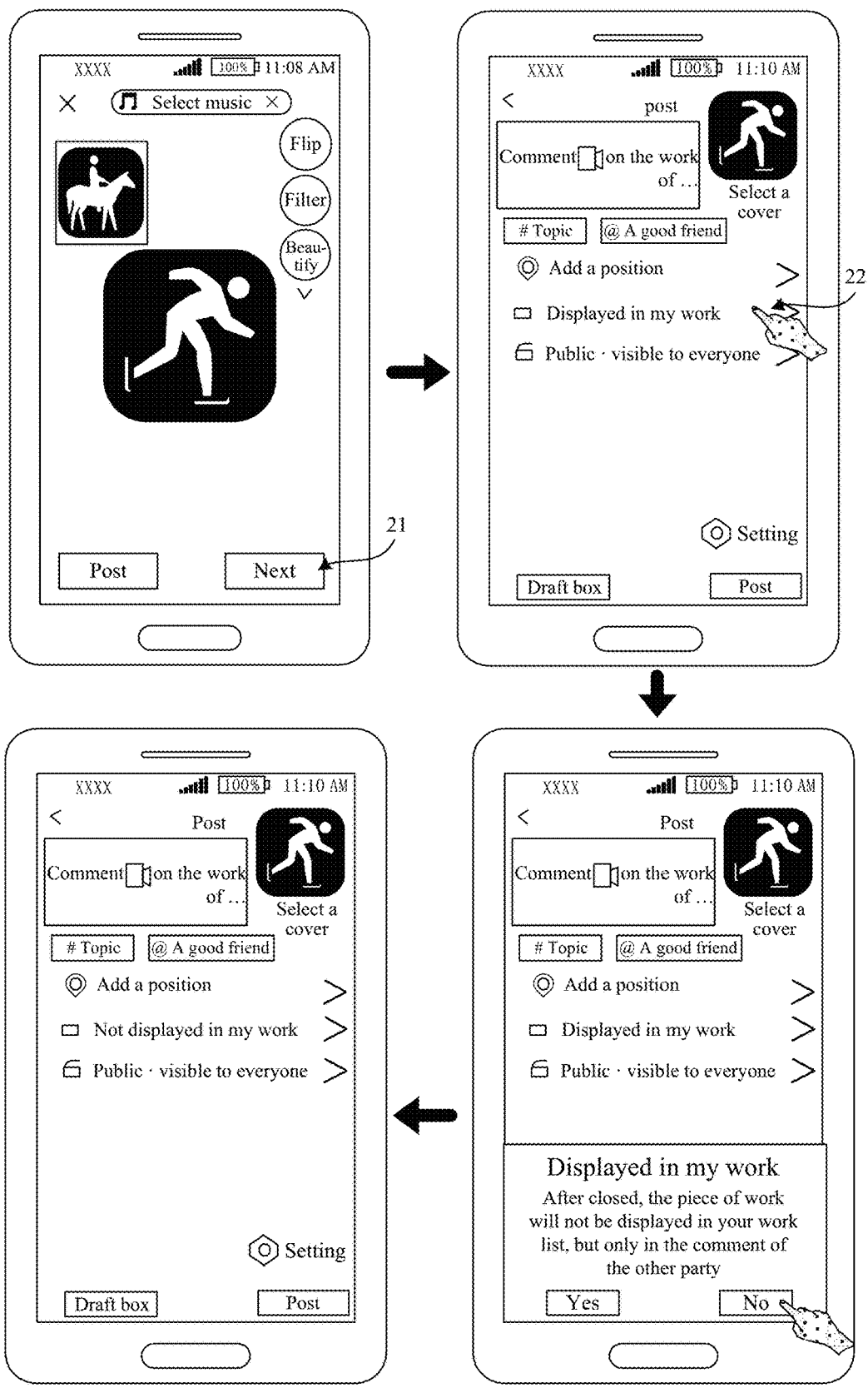
FIG. 1M is a schematic interaction diagram of operating a selection button according to embodiment one of the present disclosure.

FIG. 1M is a schematic interaction diagram of operating a selection button according to embodiment one of the present disclosure. Referring to FIG. 1M, the video posting interface is displayed in response to that an editing completion button 21 in the video editing interface is triggered, a selection pop-up window is displayed in response to that a selection button 22 in the video posting interface is triggered, and whether to display the target video in the work list of the associated user may be selected in the selection pop-up window.

In an embodiment, the method further includes the step described below.

Prompt information is acquired, where the prompt information indicates that a video posted by the target user is associated; and in response to that the view instruction is performed on the prompt information, a target page is displayed, where the target page includes a message page and a playback page of a video associated with the video posted by the target user.

Being associated may be being directly associated or being indirectly associated. For example, when the video posted by the target user is commented, being associated may be regarded as being directly associated. When the commenting with a videoing on the target user is commented, the video may be considered to be indirectly associated with the video posted by the user.

The target page may be regarded as a page presented in response to the view instruction performed on the prompt information. The message page may be regarded as a page displaying all messages received by the target user in the video interactive application. The target page may further include a page where the comment section is displayed.

In response to that the video associated with the video posted by the target user is posted, the target user may receive the prompt information. The playback page of the video associated with the video posted by the target user is a page for playing the video associated with the video posted by the target user.

In the present disclosure, the prompt information is used to prompt that the original video is associated, for example, to prompt the commenting with a video.

For example, when the original video is commented by the user A with a video, the prompt information is sent to the target user posting the original video.

In an example, when the prompt information is sent through a notice, in response to that the view instruction is performed on the prompt information, the commenting with a video may be entered, i.e., the target video playback detail page of the target video may be entered. If the target video is not visible to the current user, "The video has disappeared, please continue to browse other works" is displayed. When the prompt information is sent in the form of a notice, the cover included in the prompt information may be a video comment, i.e., the cover is a cover displayed when the target video is displayed. When the target video is displayed, it may be that only the cover is displayed, and when the target video is triggered to be played, the target video is played.

When the version of the video interactive application installed on the electronic device is lower than a value of a certain version (the value is not limited, may be limited based on the function supported by each version, and may be determined based on whether the version supports a video association function), or when the target video has no video description information, the prompt information prompts that "X replies to your work with a video". When the version of the video interactive application installed on the electronic device reaches a value of the certain version and the target video has the video description information, the prompt information includes the video description information and prompts that "Reply to your work with a video". The font size of the video description information may be greater than the font size of the information that "Reply to your work with a video".

When the prompt information is sent by pushing, in response to that the view instruction is performed on the prompt information, the message page may be entered, and the prompt information may indicate that "XX replies to your work with a video".

For example, in response to that the user B replies to the commenting with a video of the user A (that is, the original video posted by the user A) with a video, the prompt information is sent to the user A.

For the case where the prompt information is sent in the form of a notice, in response to that the view instruction is performed on the prompt information, for example, in response to that the prompt information is clicked, a video playback page of the replied video of the user B is entered.

The cover in the prompt information may use the cover of the replied video of the user B (that is, the target video posted by the user B).

When the version of the video interactive application installed on the electronic device is lower than a value of a certain version or when the video posted by the user B does not have the video description information, the prompt information indicates that "XX replies to your work with a video".

When the version of the video interactive application installed on the electronic device reaches a value of a certain version and the target video posted by the user B includes the video description information, the prompt information includes video title description and prompt information "Reply to your work with a video". The font size of the video title description may be greater than the font size of the prompt information "XX replies to your work with a video".

The video description information may be regarded as information describing the video. The video title description may be regarded as the video description information or a title determined based on the video description information.

Figures 1N, 2A:
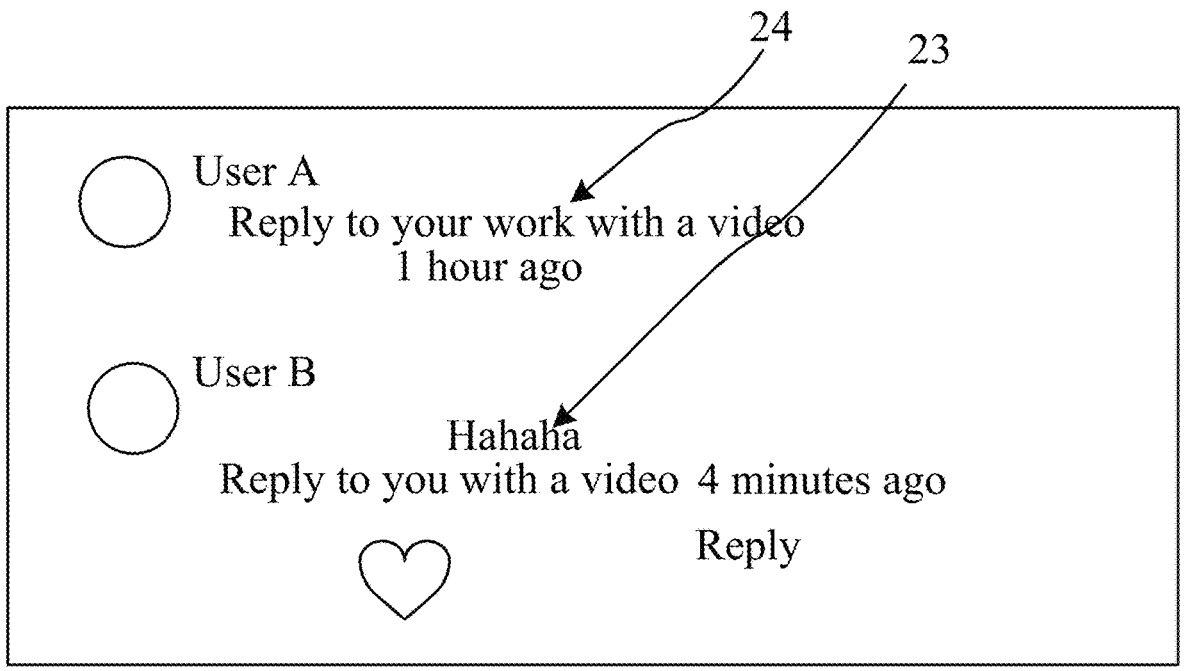
FIG. 1N is a schematic diagram of displaying prompt information according to embodiment one of the present disclosure.
FIG. 2A is a flowchart of a video playback method according to embodiment two of the present disclosure.

FIG. 1N is a schematic diagram of displaying prompt information according to embodiment one of the present disclosure. Referring to FIG. 1N, the prompt information includes video description information 23 and prompt information 24. An interactive control may also be displayed at the prompt information 24 to achieve interaction.

The prompt information is sent according to a prompt method, and in response to that the view instruction is performed on the prompt information, the message page is entered. The prompt information indicates that "XX replies to your work with a video".

In an example, in the original video of the user C, when the user B replies to the commenting with a video of the user A with a video, the prompt information is sent to the user C.

For the case where the prompt information is sent in the form of a notice, in response to that the view instruction is performed on the prompt information, the comment section of the original video of the user C is entered, and the replied video of the user B, i.e., the target video posted by the user B is positioned. The cover displayed in the prompt information uses the cover of the original video of the user C.

When the version of the video interactive application installed on the electronic device is lower than a value of a certain version or when the target video posted by the user B does not have the video description information, the prompt information indicates that "The user B replies to your work with a video".

When the version of the video interactive application installed on the electronic device reaches a value of a certain version and the target video posted by the user B has the video description information, the prompt information includes "The user B replies to user @A with a video" and "Reply to your work with a video". The font size of "The user B replies to user @A with a video" is greater than the font size of "Reply to your work with a video".

The prompt information is sent by pushing; in response to that the view instruction is performed on the prompt information, the message page is entered, and the prompt information that "The user B replies to user @A with a video" is prompted.

When the user gives a like to the commenting with a video, a notice or push notification is sent to the creator.

The like logic of the commenting with a video may follow the logic of the text comment, and the received like prompts may all indicate "A like is given to your video reply".

Embodiment Two

FIG. 2A is a flowchart of a video playback method according to embodiment two of the present disclosure. For details that are not yet detailed in this embodiment, reference is made to the aforementioned embodiment. The method is applicable to the case of video association and may be performed by a video playback apparatus. The apparatus may be implemented by software and/or hardware and is generally integrated on an electronic device. In this embodiment, the electronic device includes, but is not limited to, a mobile phone, a computer, and a personal digital assistant.

As shown in FIG. 2A, the video playback method provided in embodiment two of the present disclosure includes the step described below.

In S210, a target video is displayed on a target video playback detail page, where the target video playback detail page includes a first switch button, and an original video playback detail page of an original video is switched to display in response to that a view instruction is performed on the first switch button.

The target video playback detail page may be regarded as a detail page for playing the target video.

In the video playback method provided in embodiment two of the present disclosure, the target video is displayed on the target video playback detail page, where the target video playback detail page includes the first switch button, and the first switch button is used for switching to display the original video playback detail page of the original video in response to that the view instruction is performed so that when the target video is displayed, the associated display of the first switch button that can trigger the display of the original video is achieved. The correlation between the original video and the target video is improved, and the browser can quickly perform video jumping when browsing videos, thereby improving the browsing experience.

Based on the aforementioned embodiment, variant embodiments of the aforementioned embodiment are proposed. For the brevity of description, only differences from the aforementioned embodiment are described in the variant embodiments.

In an embodiment, the method further includes the step described below.

In response to that the view instruction is performed on the first switch button, the original video playback detail page is displayed.

Figure 2B:
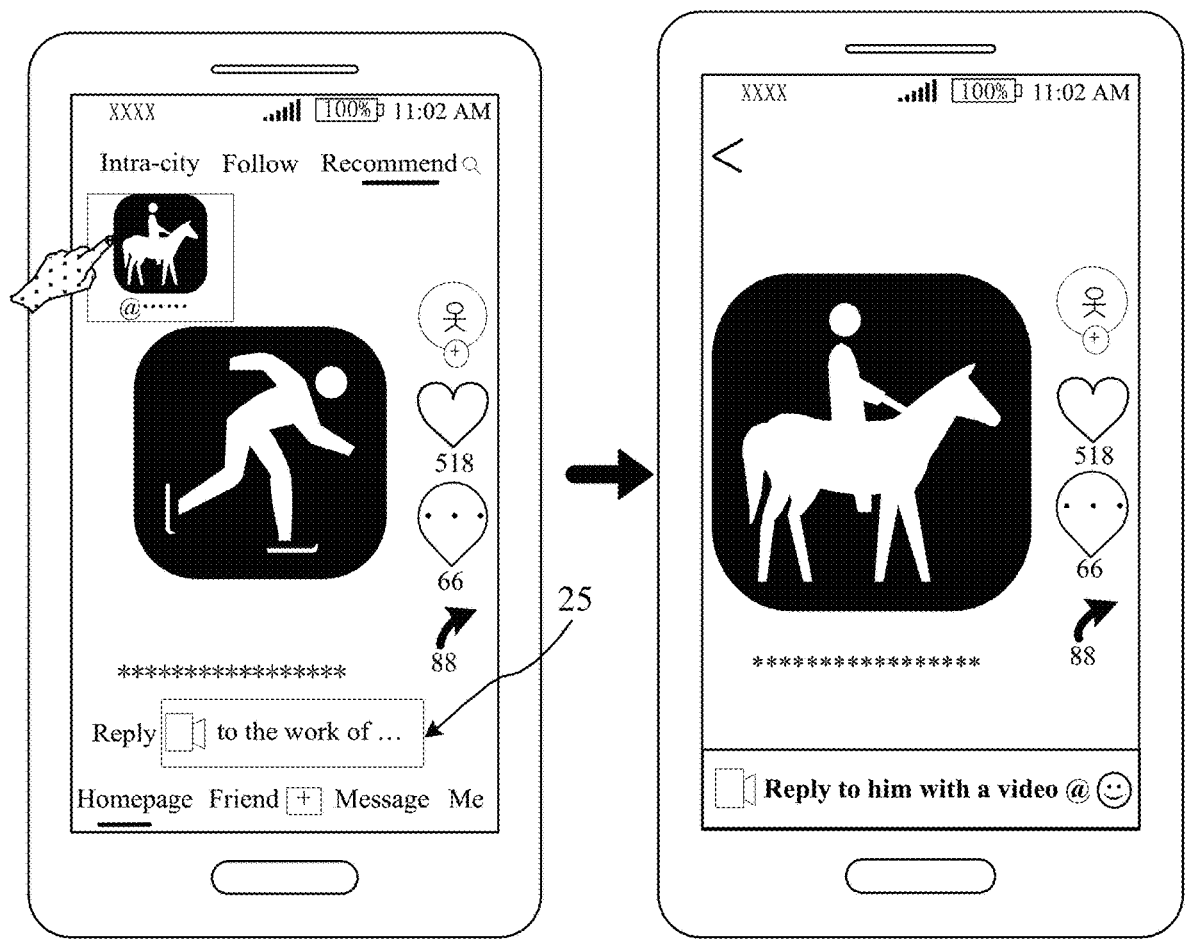
FIG. 2B is a schematic diagram illustrating switching display according to embodiment two of the present disclosure.

FIG. 2B is a schematic diagram illustrating switching display according to embodiment two of the present disclosure. Referring to FIG. 2B, in response to that the first switch button is triggered, the original video playback detail page is displayed.

In an embodiment, the method further includes the step described below.

In response to that the view instruction is performed on the target video in a comment box of the original video playback detail page, the target video playback detail page is displayed.

In response to that the first switch button switches to display the original video, if the view instruction is performed on the target video displayed in the comment box, for example, if the target video is checked, the target video playback detail page is displayed.

The following is an exemplary description of the present disclosure. When the associated user browses the original video, the associated user is supported to use the video to comment on the creator, i.e., the target user (the creator may also use the video to comment on the creator). Once successfully posted, the commenting with a video, i.e., the target video, is displayed in the comment section and may also be distributed as a normal work of a commenter (on a posting interface, i.e., the video posting interface, canceling is supported, and in response to that the display in the work list is canceled, the commenting with a video is not stored in the work list).

When other users swipe to this commenting with a video, the original video playback detail page is displayed through an original video sticker (picture-in-picture) attached to the original video.

The entry of the video association button that initiates the commenting with a video of the original video includes entry one, entry two, entry three, and entry four described below.

Entry one is a comment box in the comment section popping up in response to that any comment icon is clicked, i.e., a comment box for performing the commenting on the original video with a video.

Entry two is a comment box at the bottom of the video playback detail page, i.e., a comment box included on the first playback detail page.

Entry three is a video reply comment icon in the comment reply box popping up in response to that the commenting with a video, i.e., the target video, is clicked. The video reply comment icon may be regarded as an icon for replying to a comment (the comment may be the existing commenting with a video) through a video. The video reply comment icon may be regarded as the video association button.

When the comment box becomes the comment reply box, that is to say, if the user inputs the text to reply to a comment and then folds the keyboard or clicks on a comment notice (such as the prompt information) to pop up the comment box in the comment section, the comment box becomes the comment reply box for replying to a comment. When the comment box is the comment reply box, the entry in this case is the video reply comment icon.

Entry four is the video association button displayed in the recommendation list (that is, the second playback detail page). Whether the video association button is displayed on the original video playback detail page of the original video may be determined based on the video information of the original video. The video information may be information on whether the number of times the control displayed on a display interface is triggered exceeds a certain threshold when it is determined that the original video is displayed.

For example, the video information includes, but is not limited to, the number of video interactions, whether props are used in the video, whether the video is marked as followed, whether the video is marked as not interested, and/or whether the video includes a quick comment box. The video may be the original video.

The video information represents the number of video interactions, such as the number of times the video is liked, shared, and/or commented.

When a video is commented for no less than 50 times (the supported comment times) and does not use props or points of interest (POIs), and the video is not clicked by "not interested/followed" and recommended following, or a quick comment reply box, a red button of "Reply to him with a video", i.e., the video association button, is displayed, and the priority of triggering the video association button to display may be lower than the priority of triggering a duet with her/him button to display. "him/her" is determined based on a gender, and "him" is displayed if gender information is not provided.

In the case where the newcomer guide of the entries is initiated and the electronic device is taken as an example for the newcomer, when a new electronic device enters entry one and entry two for the first time, a newcomer guide animation (such as an animation in the form of a blue bubble) with a commenting with a video icon as the protagonist of the newcomer guide animation is displayed, and the newcomer guide animation is displayed for both entry one and entry two for only one time. During the playback of the newcomer guide animation, the user may click on the commenting with a video icon, i.e., the video association button, to enter a comment with a video capturing interface, i.e., the video capturing interface. However, during the playback of the newcomer guide animation, clicking on a text input box is invalid and will not become valid until the playback of the newcomer guide animation ends. On a same electronic device, whether to initiate the newcomer guide or not is up to whether the user is a newcomer or not. When a same user logs in to different electronic devices, each of the different electronic devices is taken as the newcomer, and the newcomer guide is initiated for the same user on each of the different electronic devices for one time.

The video capturing interface can be entered by clicking the video association button at any time.

The production of the comment with a video, i.e., the target video, is described below.

On the capturing interface, i.e., the video capturing interface, in addition to the live broadcast, entering the capturing interface from a path of commenting with a video supports all capturing modes, including snapshot photos, snapshot videos, snapshot text, segmented shooting for 15 seconds, segmented shooting for 60 seconds, and segmented shooting for 3 minutes, and the video sticker of the original video is attached by default.

On an editing interface, when through the path of commenting with a video, the capturing interface is entered and the editing interface, i.e., the video editing interface, is then entered, and the video sticker of the comment with a video is inherited.

1. The video sticker is on a consumption side, i.e., a side of browsing the target video playback detail page, and is not rendered in the target video.

2. The video sticker, i.e., the content in the first switch button, the second switch button, the third switch button or the fourth switch button contains the elements described below.

The elements are association copywriting (representing the association of the target video with the original video), replying copywriting (representing that the target video is a reply to the original video), identification information of the creator of the original video, the video cover (the video cover is obtained by cutting the video frame in the center), and/or the video title, such as the video description information. The title text beyond the threshold is represented by " . . . ".

3. The capability of setting the video sticker on the capturing interface/editing interface includes the content described below.

On the capturing interface, the duration set is not supported, however, moving, deleting, and zooming in and out are supported, a safe region is set during the moving process, and the overall interaction is consistent with the sticker interaction on the editing interface.

On the editing interface, the only difference from the capturing interface is that the editing interface supports the duration set.

4. The video sticker supports playback on the capturing interface or the editing interface.

The video sticker, i.e., the switch button, is clicked, to pop up the "View the video" button, i.e., the playback button. The "View the video" button is clicked, to enter the video playback page of the original video, i.e., the original video playback detail page. On the original video playback detail page, if the user continues to click on the commenting with a video icon, i.e., the video association button, the capturing interface or the editing interface on the upper layer is returned to. It is to be noted that the return leads to no repeated upward overlapping at the interface level.

In addition, the video sticker may not support playback on the video capturing interface or the editing interface. The video sticker is clicked to pop up the "Change the duration" button. The "Change the duration" button is clicked to enter a duration editor, thereby adjusting the duration of the original video.

5. The interaction of video stickers when moving on the capturing interface is described below.

In an embodiment, for the video sticker in the non-capturing state, when the video sticker is still, the transparency of the sticker is a first set threshold, such as 75%; and when the sticker moves, the opacity of the sticker is increased to a second set threshold, such as 100%, and a capturing ability assembly is not displayed. The present disclosure does not limit the first set threshold and the second set threshold.

In an embodiment, for the video sticker in the non-capturing state, when the video sticker is still, the transparency of the video sticker is the first set threshold, such as 75%; and when the sticker moves, it prompts that the sticker is on the capturing interface, i.e., the video capturing interface cannot be moved.

In an embodiment, the video sticker is on the editing interface, i.e., the video editing interface, movable, and the display element placeholder prompts that which region can be move to, to prevent the elements in a target work posted in response to that the user moves the video sticker from being covered.

As for the video sticker in the capturing state, the video sticker is temporarily not displayed during capturing, and the composition of the capturing frame is not affected. When the capturing is paused, the video sticker is redisplayed.

The posting interface for the commenting with a video, i.e., the video posting interface, is described below.

The posting interface includes the selection button for achieving the posting setting of whether to be "displayed in my work".

The posting interface is entered from the path of commenting with a video. Regardless of whether the user deletes a comment sticker, i.e., the video sticker, in a front capturing path (such as the video capturing interface or the video editing interface), a new switch of "Displayed in my work" is added at the bottom of the posting interface. The switch of "Displayed in my work" is clicked to pop up a setting pop-up window, and the pop-up window may include the selection button for the user to select "Displayed in my work" or "Not displayed in my work".

Whether to be "Displayed in my work" selected by the target user only determines whether the work is displayed in the work list of the creator and/or the target user and does not affect the normal distribution of the work in any other scenarios.

The posting interface includes the preset posting copywriting "Reply to the work of XX".

The posting interface is entered from the path of commenting with a video. Regardless of whether the user deletes the "comment sticker" in the front capturing path, the following copywriting is attached to a text input box by default: "Reply"+the nickname of the commenter+work, and user deletion is not supported.

The copywriting: "Response" +video icon+the nickname of the commenter+"video" (if the creator of the original video sets a name remark for the commenter, the nickname on the video sticker should not display the name remark, but should display the original nickname of the commenter). The nickname of the commenter may be replaced with the nickname of a commented person. The creator of the target video set a name remark for the commented person. The nickname on the video sticker should not display the name remark, but should display the original nickname of the commented person.

The comment icon and the nickname of the commenter may be highlighted.

The posting a comment with a video is described below.

The content displayed in response to that the posting button is triggered is not limited herein. The video in the recommendation list may be displayed, or the comment section of the original video may be displayed.

The commenting with a video is initiated from entry one or entry two, i.e., the comment box in the comment section or the comment box at the bottom of the original video playback detail page. In response to that a posting button, i.e., the posting button, is clicked, the original video is returned to and the comment section is unfolded, the video cover is inserted at the top of the comment (the video cover is aligned with the text comment), and the video cover and the upload progress are displayed in real time.

During uploading, the upload progress and copywriting "Posting" are displayed on the cover, i.e., the video cover, "Commenting with a video" is clicked, and "Uploading" is displayed on the cover.

When the upload is completed, the upload progress and copywriting "Uploading" on the cover is not displayed, a playback button is displayed, and a prompt "The work has been successfully posted! Click to view." is displayed at the top and is consistent with the original success prompt in response to that the video is posted.

Upload failure or exception is consistent with the upload failure or exception of an ordinary video, and a failure pop-up window is displayed.

The commenting with a video is initiated through entry four, i.e., the video association button in the recommendation list, and the video in the recommendation list may continue to be displayed.

The consumption, i.e., the browsing of the commenting with a video is described below.

The commenting with a video consists of title copywriting, the video cover, the date, a reply button, and a like button.

As for the title copywriting, the title copywriting, written by the creator of the target video on the posting interface when the commenting with a video is posted, with the prefix "Reply to the work of XX" removed, are displayed in the comment section as comment copywriting, and topics/@friends added in the copywriting can be clicked. The title copywriting may be regarded as the video description information of the target video.

As for the video cover, if the current comment with a video is flashing, a flashing blur cover is used, and if the current comment with a video is normal, a normal cover is used. The playback detail page of the corresponding video is displayed in response to clicking anywhere in the cover region.

As for the date, the commenting with a video has the same date format and style as a comment posted in a manner other than in manner of video.

As for the reply button, the reply button is clicked to open the comment reply box, and when a video reply icon in the comment reply box is clicked, the process of "video for commenting with a video" for the current comment with a video, i.e., the process of achieving video association and posting the target video, is followed.

As for the like button, a like is given, i.e., like +1 is performed.

Clicking on the commenting with a video is consistent with clicking on the "Reply" button, and then the comment reply box is opened.

A list is displayed by long pressing the commenting with a video and is divided into a host mode and a guest mode.

i. In the host mode, replying with a video, replying with a private message, searching, pinning (unpinning), and deleting are displayed from top to bottom.

ii. In the guest mode, replying with a private message and searching are displayed.

The host may be the poster of the comment with a video. The guest may be the browser of the target video.

As for the comment with a video, the sorting of comments with a video, i.e., target videos, follows the original sorting rule of the comment section, and the folding and pinning of the comments with a video are consistent with the folding and pinning of normal text comments without special logic.

The video playback page is described below.

In an embodiment, in response to that the video playback page is clicked, i.e., in response to that any region of the video sticker on the target video playback detail page is clicked, the video playback detail page of the current comment with a video is directly displayed.

In an embodiment, clicking on the "Reply to the work of XX" button (the button may also be regarded as the fourth switch button) in a title description region is consistent with the aforementioned interaction of clicking on the video sticker and displaying the video playback detail page.

In an embodiment, in response to that the original video playback detail page is displayed, if the user clicks on the video cover of the current comment with a video in the corresponding comment section of the playback detail page, the video playback page of the commenting with a video is returned to. It is to be noted that the return leads to no repeated upward overlapping at the page level.

In an embodiment, in response to that the video sticker is clicked, i.e., any region of the first switch button, the second switch button, the third switch button or the fourth switch button is clicked, a bubble and the "View the video" option are displayed, and in response to that the bubble and the "View the video" option are clicked, the video playback detail page of the current comment with a video, i.e., the original video playback detail page, is directly displayed.

In an embodiment, clicking on "Reply to the work of XX" (for example, a fourth switch button 25 in FIG. 2B) in the title description region is consistent with the aforementioned interaction of clicking on the cover and displaying the video playback detail page.

Embodiment Three

Figure 3:
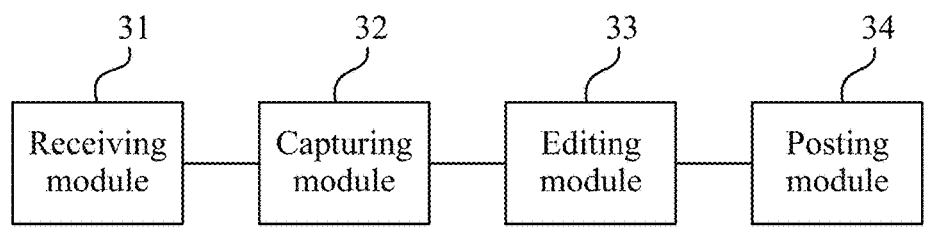
FIG. 3 is a structural diagram of a video posting apparatus according to embodiment three of the present disclosure.

FIG. 3 is a structural diagram of a video posting apparatus according to embodiment three of the present disclosure. The apparatus is applicable to the case of video association. The apparatus may be implemented by software and/or hardware and is generally integrated on an electronic device.

As shown in FIG. 3, the apparatus includes a receiving module 31, a capturing module 32, an editing module 33, and a posting module 34.

The receiving module 31 is configured to, in response to that a trigger instruction performed on a video association button for an original video is received, display a video capturing interface. The capturing module 32 is configured to, in response to that an associated video has been captured through the video capturing interface, display a video editing interface, where the associated video is a video associated with the original video. The editing module 33 is configured to, in response to that an editing completion button in the video editing interface is triggered, display a video posting interface. The posting module 34 is configured to, in response to that a posting button in the video posting interface is triggered, post a target video, where the posting button is used for posting the associated video as the target video, a first switch button for the original video is displayed on a target video playback detail page of the target video, the first switch button is used for switching to display an original video playback detail page of the original video in response to that a view instruction is performed on the first switch button, and the posted target video is displayed in a comment section of the original video.

In this embodiment, in the apparatus, the receiving module 31 displays the video capturing interface in response to that the trigger instruction performed on the video association button for the original video is received; the capturing module 32 displays the video editing interface in response to that the associated video has been captured through the video capturing interface, where the associated video is a video associated with the original video; the editing module 33 displays the video posting interface in response to that the editing completion button in the video editing interface is triggered; and finally, the posting module 34 posts the target video in response to that the posting button in the video posting interface is triggered, where the posting button is used for posting the associated video as the target video, the first switch button for the original video is displayed on the target video playback detail page of the target video, and the first switch button is used for switching to display the original video playback detail page of the original video in response to that the view instruction is performed.

This embodiment provides the video posting apparatus. In response to that the video association button of the original video is triggered, the target video is posted, and the posted target video is associated with the original video.

In an embodiment, a button for switching the target video includes the first switch button, a second switch button displayed on the video capturing interface, a third switch button displayed on the video editing interface, and a fourth switch button displayed on the video posting interface, where the second switch button is used for switching to display the original video playback detail page in response to that the view instruction is performed, the third switch button is used for switching to display the original video playback details page in response to that the view instruction is performed, adjustment of a playback duration of the original video is triggered in response to that a duration adjustment instruction is performed on the third switch button, the video posting interface includes the fourth switch button, and the fourth switch button is used for switching to display the original video playback detail page in response to that the view instruction is performed. When the switch button is displayed, one or more of identification information of a target user, cover information of the original video, or description information of the original video is displayed. In a non-capturing state, the movement attribute of the second switch button is non-movable or movable.

In an embodiment, in the case where the original video satisfies an invisibility condition, when the switch button is displayed, prompt information that the original video is not capable of being played and a preset cover are displayed.

In an embodiment, the invisibility condition includes whether a user browsing the target video satisfies a condition for browsing the original video or whether the time of browsing the target video is within a time interval of browsing the original video.

In an embodiment, the second switch button is used for switching to display the original video playback detail page in response to that the view instruction is performed, the third switch button is used for switching to display the original video playback details page in response to that the view instruction is performed, adjustment of a playback duration of the original video is triggered in response to that a duration adjustment instruction is performed on the third switch button, the video posting interface includes the fourth switch button, and the fourth switch button is used for switching to display the original video playback detail page in response to that the view instruction is performed.

In an embodiment, the video association button is included in one or more of the comment boxes described below.

The comment boxes include a comment box for commenting on the original video with a video in a comment interface, a comment box included on the original video playback detail page, or a comment box for replying to the original video with a video in the comment interface. The original video playback detail page includes a first playback detail page or a second playback detail page. The first playback detail page is a page displayed in response to that the original video in a work list of the target user is triggered to be displayed. The target user is a user who posts the original video. A trigger display mode of the second playback detail page is a mode other than a trigger display mode of the first playback detail page. When the video association button is displayed to a set user for the first time, instruction information of the video association button is displayed, where the set user is a user who triggers the display of the comment box, and the instruction information is instruction information for the video association button. In the case where the video reply to the original video is performed, the original video is a comment in the comment interface, and the comment box for replying to the original video with a video is displayed on the comment interface in response to that the set user triggers a reply button of the original video. In the case where the commenting on the original video with a video is performed, the comment interface of the original video includes the comment section, the comment section includes the comment box for performing the commenting on the original video with a video, and the comment box for performing the commenting on the original video with a video is displayed directly on the comment interface.

In an embodiment, the apparatus further includes a displaying module. The displaying module is configured to, in response to that the posting button is triggered, display the original video and the comment section corresponding to the original video, where an upload progress of the target video is displayed in the comment section; and in response to that the target video is uploaded, display the target video in the comment section.

In an embodiment, the apparatus further includes a returning module configured to perform the step described below.

In response to that switching is performed to display the original video, in the case where the video association button is triggered again, an interface before the switching is returned to.

In an embodiment, the video posting interface includes a selection button for selecting whether to display the target video in a work list of an associated user.

In an embodiment, the apparatus further includes an acquisition module configured to perform the steps described below.

Prompt information is acquired, where the prompt information indicates that a video posted by the target user is associated; and in response to that the view instruction is performed on the prompt information, a target page is displayed, where the target page includes a message page and a playback page of a video associated with the video posted by the target user.

The aforementioned video posting apparatus may perform the video posting method according to embodiment one of the present disclosure and has function modules and effects corresponding to the performed method.

Embodiment Four

Figures 4, 5:
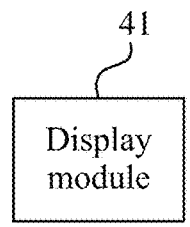
FIG. 4 is a structural diagram of a video playback apparatus according to embodiment four of the present disclosure.
FIG. 5 is a structural diagram of an electronic device according to embodiment five of the present disclosure.

FIG. 4 is a structural diagram of a video playback apparatus according to embodiment four of the present disclosure. The apparatus is applicable to the case of video association. The apparatus may be implemented by software and/or hardware and is generally integrated on an electronic device.

As shown in FIG. 4, the apparatus includes a displaying module 41.

The displaying module 41 is configured to display a target video on a target video playback detail page, where the target video playback detail page includes a first switch button, and an original video playback detail page of an original video is switched to display in response to that a view instruction is performed on the first switch button.

This embodiment provides the video playback apparatus. The video playback apparatus displays the target video on the target video playback detail page, where the target video playback detail page includes the first switch button, and the first switch button is used for switching to display the original video playback detail page of the original video in response to that the view instruction is performed so that when the target video is displayed, the associated display of the first switch button that can trigger the display of the original video is achieved. The correlation between the original video and the target video is improved, and the browser can quickly perform video jumping when browsing videos, thereby improving the browsing experience.

In an embodiment, the apparatus further includes a switching module configured to perform the step described below.

In response to that the view instruction is performed on the first switch button, the original video playback detail page is displayed.

In an embodiment, the apparatus further includes a returning module configured to perform the step described below.

In response to that the view instruction is performed on the target video in a comment box of the original video playback detail page, the target video playback detail page is displayed.

The aforementioned video playback apparatus may perform the video playback method according to embodiment two of the present disclosure and has function modules and effects corresponding to the performed method.

Embodiment Five

FIG. 5 is a structural diagram of an electronic device according to embodiment five of the present disclosure. FIG. 5 is a structural diagram of an electronic device 400 applicable to implementing the embodiments of the present disclosure. The electronic device 400 in the embodiment of the present disclosure may include, but is not limited to, mobile terminals such as a mobile phone, a laptop, a digital broadcast receiver, a personal digital assistant (PDA), a portable Android device (PAD), a portable media player (PMP) and a vehicle-mounted terminal (such as a vehicle-mounted navigation terminal), and fixed terminals such as a digital television (TV) and a desktop computer. The electronic device 400 shown in FIG. 5 is merely an example and is not intended to limit the function and use scope of embodiments of the present disclosure.

As shown in FIG. 5, the electronic device 400 may include one or more processing apparatuses (such as a central processing unit and a graphics processing unit) 401. The one or more processing apparatuses 401 may execute various appropriate actions and processing according to a program stored in a read-only memory (ROM) 402 or a program loaded into a random access memory (RAM) 403 from a storage apparatus 408. The one or more processing apparatuses 401 perform the video posting method or the video playback method according to the present disclosure.

Various programs and data required for the operation of the electronic device 400 are also stored in the RAM 403. The processing apparatus 401, the ROM 402, and the RAM 403 are connected to each other through a bus 404. An input/output (I/O) interface 405 is also connected to the bus 404.

Generally, the following apparatuses may be connected to the I/O interface 405: an input apparatus 406 such as a touch screen, a touchpad, a keyboard, a mouse, a camera, a microphone, an accelerometer, and a gyroscope; an output apparatus 407 such as a liquid crystal display (LCD), a speaker, and a vibrator; the storage apparatus 408 configured to store one or more programs, such as a magnetic tape and a hard disk; and a communication apparatus 409. The communication apparatus 409 may allow the electronic device 400 to perform wireless or wired communication with other devices to exchange data. Although FIG. 5 shows the electronic device 400 having various apparatuses, it is to be understood that not all the apparatuses shown herein need to be implemented or present. Alternatively, more or fewer apparatuses may be implemented.

According to the embodiments of the present disclosure, the processes described in the aforementioned with reference to the flowcharts may be implemented as computer software programs. For example, this embodiment of the present disclosure includes a computer program product. The computer program product includes a computer program carried in a computer-readable medium. The computer program includes program codes for performing the method shown in the flowcharts. In such an embodiment, the computer program may be downloaded from a network and installed through the communication apparatus 409, or may be installed from the storage apparatus 408, or may be installed from the ROM 402. When the computer program is executed by the processing apparatus 401, the aforementioned functions defined in the methods in the embodiments of the present disclosure are implemented.

The aforementioned computer-readable medium of the present disclosure may be a computer-readable signal medium or a computer-readable storage medium or any combination thereof. The computer-readable storage medium may be, but is not limited to, an electrical, magnetic, optical, electromagnetic, infrared, or semiconductor system, apparatus, or device, or any combination thereof. Examples of the computer-readable storage medium may include, but are not limited to, an electrical connection having one or more wires, a portable computer disk, a hard disk, a RAM, a ROM, an erasable programmable read-only memory (EPROM), a flash memory, an optical fiber, a portable compact disc read-only memory (CD-ROM), an optical memory device, a magnetic memory device, or any suitable combination thereof. In the present disclosure, the computer-readable storage medium may be any tangible medium including or storing a program. The program may be used by or in conjunction with an instruction execution system, apparatus, or device. In the present disclosure, the computer-readable signal medium may include a data signal propagated in the baseband or as part of a carrier wave, where computer-readable program codes are carried in the data signal. The data signal propagated in this manner may be in various forms, including, but not limited to, an electromagnetic signal, an optical signal, or any appropriate combination thereof. The computer-readable signal medium may also be any computer-readable medium other than the computer-readable storage medium. The computer-readable signal medium may send, propagate or transmit a program used by or in conjunction with an instruction execution system, apparatus, or device. Program codes included on the computer-readable medium may be transmitted by any suitable medium, including, but not limited to, a wire, an optical cable, a radio frequency (RF), or any suitable combination thereof.

In some embodiments, clients and servers may communicate using any network protocol currently known or to be developed future, such as Hypertext Transfer Protocol (HTTP), and may be interconnected with any form or medium of digital data communication (for example, a communication network). Examples of the communication network include a local area network (LAN), a wide area network (WAN), an inter-network (for example, the Internet), a peer-to-peer network (for example, an ad hoc network), and any network currently known or developed in the future.

The aforementioned computer-readable medium may be included in the electronic device 400 or may exist alone without being assembled into the electronic device 400.

The aforementioned computer-readable medium stores one or more computer programs. When executed by the processing apparatus, the one or more programs cause the processing apparatus to perform the video posting method described below.

In response to that a trigger instruction performed on a video association button for an original video is received, a video capturing interface is displayed; in response to that an associated video has been captured through the video capturing interface, a video editing interface is displayed, where the associated video is a video associated with the original video; in response to that an editing completion button in the video editing interface is triggered, a video posting interface is displayed; and in response to that a posting button in the video posting interface is triggered, a target video is posted, where the posting button is used for posting the associated video as the target video, a first switch button for the original video is displayed on a target video playback detail page of the target video, the first switch button is used for switching to display an original video playback detail page of the original video in response to that a view instruction is performed on the first switch button, and the posted target video is displayed in a comment section of the original video.

The aforementioned computer-readable medium stores one or more computer programs. When executed by the processing apparatus, the one or more programs cause the processing apparatus to perform the video playback method described below.

A target video is displayed on a target video playback detail page, where the target video playback detail page includes a first switch button, and an original video playback detail page of an original video is switched to display in response to that a view instruction is performed on the first switch button.

The aforementioned computer-readable medium carries one or more programs. When executed by the electronic device, the aforementioned one or more programs cause the electronic device 400 to write computer program codes for performing the instructions of the present disclosure in one or more programming languages or a combination thereof. The aforementioned one or more programming languages include object-oriented programming languages such as Java, Smalltalk, and C++, as well as conventional procedural programming languages such as "C" or similar programming languages. The program codes may be executed entirely on a user computer, executed partly on a user computer, executed as a stand-alone software package, executed partly on a user computer and partly on a remote computer, or executed entirely on a remote computer or a server. In the scenario involving the remote computer, the remote computer may be connected to the user computer through any type of network, including a local area network (LAN) or a wide area network (WAN), or the connection may be made to an external computer (for example, through the Internet using an Internet service provider).

The flowcharts and block diagrams in the drawings illustrate possible architectures, functions, and instructions of the system, method, and computer program product according to the embodiments of the present disclosure. Each block in the flowcharts or block diagrams may represent a module, a program segment, or part of codes that contains one or more executable instructions for implementing specified logical functions. It is also to be noted that in some alternative implementations, the functions marked in the blocks may be implemented in an order different from those marked in the drawings. For example, two successive blocks may, in fact, be performed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system executing specified functions or operations or may be implemented by a combination of special-purpose hardware and computer instructions.

The described modules involved in the embodiments of the present disclosure may be implemented by software or hardware. The name of a module is not intended to limit the module in a circumstance.

The functions described herein may be performed, at least partially, by one or more hardware logic components. For example, without limitation, example types of hardware logic components that can be used include a field-programmable gate array (FPGA), an application-specific integrated circuit (ASIC), an application-specific standard product (ASSP), a system on a chip (SoC), a complex programmable logic device (CPLD), and the like.

In the context of the present disclosure, a machine-readable medium may be a tangible medium that may include or store a program used by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any appropriate combination thereof. Examples of the machine-readable storage medium include an electrical connection based on one or more wires, a portable computer disk, a hard disk, a RAM, a ROM, an EPROM, a flash memory, an optical fiber, a CD-ROM, an optical storage device, a magnetic storage device or any appropriate combination thereof.

According to one or more embodiments of the present disclosure, example one provides a video posting method. The video posting method includes the steps described below.

In response to that a trigger instruction performed on a video association button for an original video is received, a video capturing interface is displayed.

In response to that an associated video has been captured through the video capturing interface, a video editing interface is displayed, where the associated video is a video associated with the original video.

In response to that an editing completion button in the video editing interface is triggered, a video posting interface is displayed.

In response to that a posting button in the video posting interface is triggered, a target video is posted, where the posting button is used for posting the associated video as the target video, a first switch button for the original video is displayed on a target video playback detail page of the target video, the first switch button is used for switching to display an original video playback detail page of the original video in response to that a view instruction is performed on the first switch button, and the posted target video is displayed in a comment section of the original video.

According to one or more embodiments of the present disclosure, according to the method in example one, in example two, the following is described.

A switch button for switching the target video includes the first switch button, a second switch button displayed on the video capturing interface, a third switch button displayed on the video editing interface, and a fourth switch button displayed on the video posting interface, where the second switch button is used for switching to display the original video playback detail page in response to that the view instruction is performed, the third switch button is used for switching to display the original video playback details page in response to that the view instruction is performed, adjustment of a playback duration of the original video is triggered in response to that a duration adjustment instruction is performed on the third switch button, the video posting interface includes the fourth switch button, and the fourth switch button is used for switching to display the original video playback detail page in response to that the view instruction is performed.

In a non-capturing state, the movement attribute of the second switch button is non-movable or movable.

According to one or more embodiments of the present disclosure, according to the method in example two, in example three, the method further includes the step described below.

In the case where the original video satisfies an invisibility condition, when the switch button is displayed, prompt information that the original video is not capable of being played and a preset cover are displayed.

According to one or more embodiments of the present disclosure, according to the method in example three, in example four, the following is described.

The invisibility condition includes whether a user browsing the target video satisfies a condition for browsing the original video or whether the time of browsing the target video is within a time interval of browsing the original video.

According to one or more embodiments of the present disclosure, according to the method in example two, in example five, when the switch button is displayed, one or more of identification information of a target user, cover information of the original video, or description information of the original video is displayed.

According to one or more embodiments of the present disclosure, according to the method in example one, in example six, the following is described.

The video association button is included in one or more of the comment boxes described below.

The comment boxes include a comment box for commenting on the original video with a video in a comment interface, a comment box included on the original video playback detail page, a comment box for replying to the original video with a video in the comment interface.

The original video playback detail page includes a first playback detail page or a second playback detail page, where the first playback detail page is a page displayed in response to that the original video in a work list of the target user is triggered to be displayed, the target user is a user who posts the original video, and a trigger display mode of the second playback detail page is a mode other than a trigger display mode of the first playback detail page; when the video association button is displayed to a set user for the first time, instruction information of the video association button is displayed, where the set user is a user who triggers the display of the comment box, and the instruction information is instruction information for the video association button. In the case where the video reply to the original video is performed, the original video is a comment in the comment interface, and the comment box for replying to the original video with a video is displayed on the comment interface in response to that the set user triggers a reply button of the original video; and in the case where the commenting on the original video with a video is performed, the comment interface of the original video includes the comment section, the comment section includes the comment box for commenting on the original video with a video, and the comment box for performing the commenting on the original video with a video is displayed directly on the comment interface.

According to one or more embodiments of the present disclosure, according to the method in example one, in example seven, the method further includes the steps described below.

In response to that the posting button is triggered, the original video and the comment section corresponding to the original video are displayed, where an upload progress of the target video is displayed in the comment section; and in response to that the target video is uploaded, the target video is displayed in the comment section.

According to one or more embodiments of the present disclosure, according to the method in example one, in example eight, the method further includes the step described below.

In response to that switching is performed to display the original video, in the case where the video association button is triggered again, an interface before the switching is returned to.

According to one or more embodiments of the present disclosure, according to the method in example one, in example nine, the video posting interface includes a selection button for selecting whether to display the target video in a work list of an associated user.

According to one or more embodiments of the present disclosure, according to the method in example one, in example ten, the method further includes the steps described below.

Prompt information is acquired, where the prompt information indicates that a video posted by the target user is associated; and in response to that the view instruction is performed on the prompt information, a target page is displayed, where the target page includes a message page and a playback page of a video associated with the video posted by the target user.

According to one or more embodiments of the present disclosure, example eleven provides a video playback method. The video playback method includes the step described below.

A target video is displayed on a target video playback detail page, where the target video playback detail page includes a first switch button, and an original video playback detail page of an original video is switched to display in response to that a view instruction is performed on the first switch button.

According to one or more embodiments of the present disclosure, according to the method in example eleven, in example twelve, the method further includes the step described below.

In response to that the view instruction is performed on the first switch button, the original video playback detail page is displayed.

According to one or more embodiments of the present disclosure, according to the method in example twelve, in example thirteen, the method further includes the step described below.

In response to that the view instruction is performed on the target video in a comment box of the original video playback detail page, the target video playback detail page is displayed.

According to one or more embodiments of the present disclosure, example fourteen provides a video posting apparatus. The video posting apparatus includes a receiving module, a capturing module, an editing module, and a posting module.

The receiving module is configured to, in response to that a trigger instruction performed on a video association button for an original video is received, display a video capturing interface.

The capturing module is configured to, in response to that an associated video has been captured through the video capturing interface, display a video editing interface, where the associated video is a video associated with the original video.

The editing module is configured to, in response to that an editing completion button in the video editing interface is triggered, display a video posting interface.

The editing module is configured to, in response to that a posting button in the video posting interface is triggered, post a target video, where the posting button is used for posting the associated video as the target video, a first switch button for the original video is displayed on a target video playback detail page of the target video, the first switch button is used for switching to display an original video playback detail page of the original video in response to that a view instruction is performed on the first switch button, and the posted target video is displayed in a comment section of the original video.

According to one or more embodiments of the present disclosure, example fifteen provides a video playback apparatus. The video playback apparatus includes a displaying module.

The displaying module is configured to display a target video on a target video playback detail page, where the target video playback detail page includes a first switch button, and an original video playback detail page of an original video is switched to display in response to that a view instruction is performed on the first switch button.

According to one or more embodiments of the present disclosure, example sixteen provides an electronic device. The electronic device includes one or more processing apparatuses and a storage apparatus configured to store one or more programs.

When executed by the one or more processing apparatuses, the one or more programs cause the one or more processing apparatuses to perform the method in examples one to thirteen of the present disclosure.

According to one or more embodiments of the present disclosure, example seventeen provides a computer-readable medium storing a computer program which, when executed by a processing apparatus, causes the processing apparatus to perform the method in any one of examples one to thirteen.

Additionally, although multiple operations are described in a particular order, it is not a must to perform these operations in this particular order or in sequential order. In certain circumstances, multitasking and parallel processing may be advantageous. Similarly, although multiple implementation details are included in the aforementioned discussion, these should not be construed as limiting the scope of the present disclosure. Some features described in the context of separate embodiments may be implemented in combination in a single embodiment. Rather, features described in the context of a single embodiment may also be implemented in multiple embodiments separately or in any appropriate sub-combination.

What is claimed is:

1. A video posting method, comprising:
   in response to receiving a first instruction for capturing an associated video that is associated with an original video, displaying a video capturing interface, wherein the associated video is different from the original video;
   capturing the associated video through the video capturing interface;
   in response to receiving a second instruction for posting the associated video, posting the associated video, wherein the associated video includes a user interface element associated with the original video, and wherein the user interface element is configured to switch to display the original video;
   displaying, on a page of displaying the associated video, the user interface element configured to switch to display the original video; and
   in response to receiving a third instruction on the user interface element, displaying the original video.

2. The method of claim 1, further comprising:
   in response to that the original video satisfies an invisibility condition, and in response to receiving the third instruction on the user interface element, displaying prompt information that the original video is not capable of being played and a preset cover.

3. The method of claim 1, further comprising:
   in response to receiving the third instruction on the user interface element, displaying at least one of identification information of a target user, cover information of the original video, or description information of the original video.

4. The method of claim 1, wherein the receiving the first instruction for capturing the associated video on the original video comprising at least one of the following:
receiving the first instruction for capturing the associated video on a comment box for commenting on the original video with a video in a comment interface;
receiving the first instruction for capturing the associated video on a comment box comprised on the original video playback detail page; or, receiving the first instruction for capturing the associated video on a comment box for replying to the original video with a video in the comment interface; and
wherein an original video playback detail page of the original video comprises a first playback detail page or a second playback detail page, wherein the first playback detail page is displayed in response to that the original video in a work list of a target user is triggered to be displayed, and the second playback detail page is triggered to be displayed in a different manner from that the first playback detail page is triggered to be displayed.

5. The method of claim 1, wherein in response to receiving the second instruction for posting the associated video, posting the associated video comprises:
in response to receiving the second instruction for posting the associated video, displaying the original video and a comment section corresponding to the original video, wherein an upload progress of the associated video is displayed in the comment section; and
in response to that the associated video is uploaded, displaying the associated video in the comment section.

6. The method of claim 1, further comprising:
in response to receiving a fourth instruction for switching to the associated video on the original video, displaying the associated video.

7. The method of claim 1, further comprising:
in response to receiving a fifth instruction for displaying the associated video in a work list of an associated user, displaying the associated video in the work list of the associated user.

8. The method of claim 1, further comprising:
acquiring prompt information, wherein the prompt information prompts that a video posted by a target user is associated; and
in response to receiving a sixth instruction for displaying a target page on the prompt information, displaying the target page, wherein the target page comprises a message page and a playback page of a video associated with a video posted by the target user.

9. An electronic device, comprising:
at least one processing apparatus; and
a storage apparatus configured to store at least one program;
wherein when executed by the at least one processing apparatus, the at least one program causes the at least one processing apparatus to perform:
in response to receiving a first instruction for capturing an associated video that is associated with an original video, displaying a video capturing interface, wherein the associated video is different from the original video;
capturing the associated video through the video capturing interface;

in response to receiving a second instruction for posting the associated video, posting the associated video, wherein the associated video includes a user interface element associated with the original video, and wherein the user interface element is configured to switch to display the original video;
displaying, on a page of displaying the associated video, the user interface element configured to switch to display the original video; and
in response to receiving a third instruction on the user interface element, displaying the original video.

10. The electronic device of claim 9, wherein when executed by the at least one processing apparatus, the at least one program causes the at least one processing apparatus to perform:
in response to that the original video satisfies an invisibility condition, and in response to receiving the third instruction on the user interface element, displaying prompt information that the original video is not capable of being played and a preset cover.

11. The electronic device of claim 9, wherein when executed by the at least one processing apparatus, the at least one program causes the at least one processing apparatus to perform:
in response to receiving the third instruction on the user interface element, displaying at least one of identification information of a target user, cover information of the original video, or description information of the original video.

12. The electronic device of claim 9, wherein the receiving the first instruction for capturing the associated video on the original video comprising at least one of the following:
receiving the first instruction for capturing the associated video on a comment box for commenting on the original video with a video in a comment interface;
receiving the first instruction for capturing the associated video on a comment box comprised on the original video playback detail page; or, receiving the first instruction for capturing the associated video on a comment box for replying to the original video with a video in the comment interface; and
wherein an original video playback detail page of the original video comprises a first playback detail page or a second playback detail page, wherein the first playback detail page is displayed in response to that the original video in a work list of a target user is triggered to be displayed, and the second playback detail page is triggered to be displayed in a different manner from that the first playback detail page is triggered to be displayed.

13. The electronic device of claim 9, wherein in response to receiving the second instruction for posting the associated video, posting the associated video comprises:
in response to receiving the second instruction for posting the associated video, displaying the original video and a comment section corresponding to the original video, wherein an upload progress of the associated video is displayed in the comment section; and
in response to that the associated video is uploaded, displaying the associated video in the comment section.

14. The electronic device of claim 9, wherein when executed by the at least one processing apparatus, the at least one program causes the at least one processing apparatus to perform:
in response to receiving a fourth instruction for switching to the associated video on the original video, displaying the associated video.

15. The electronic device of claim 9, wherein when executed by the at least one processing apparatus, the at least one program causes the at least one processing apparatus to perform:

in response to receiving a fifth instruction for displaying the associated video in a work list of an associated user, displaying the associated video in the work list of the associated user.

16. The electronic device of claim 9, wherein when executed by the at least one processing apparatus, the at least one program causes the at least one processing apparatus to perform:

acquiring prompt information, wherein the prompt information prompts that a video posted by a target user is associated; and in response to receiving a sixth instruction for displaying a target page on the prompt information, displaying the target page, wherein the target page comprises a message page and a playback page of a video associated with a video posted by the target user.

17. A non-transitory computer-readable storage medium storing a computer program which, when executed by a processing apparatus, causes the processing apparatus to perform:

in response to receiving a first instruction for capturing an associated video that is associated with an original video, displaying a video capturing interface, wherein the associated video is different from the original video;

capturing the associated video through the video capturing interface;

in response to receiving a second instruction for posting the associated video, posting the associated video, wherein the associated video includes a user interface element associated with the original video, and wherein the user interface element is configured to switch to display the original video;

displaying, on a page of displaying the associated video, the user interface element configured to switch to display the original video; and in response to receiving a third instruction on the user interface element, displaying the original video.

18. The storage medium of claim 17, wherein the computer program, when executed by the processing apparatus, causes the processing apparatus to perform:

in response to that the original video satisfies an invisibility condition, and in response to receiving the third instruction on the user interface element, displaying prompt information that the original video is not capable of being played and a preset cover.

19. The storage medium of claim 17, wherein the computer program, when executed by the processing apparatus, causes the processing apparatus to perform:

in response to receiving the third instruction on the user interface element, displaying at least one of identification information of a target user, cover information of the original video, or description information of the original video.

20. The storage medium of claim 17, wherein in response to receiving the second instruction for posting the associated video, posting the associated video comprises:

in response to receiving the second instruction for posting the associated video, displaying the original video and a comment section corresponding to the original video, wherein an upload progress of the associated video is displayed in the comment section; and in response to that the associated video is uploaded, displaying the associated video in the comment section.

\* \* \* \* \*